United States Patent
Picard

(10) Patent No.: US 10,642,353 B2
(45) Date of Patent: May 5, 2020

(54) NON-TRANSITORY COMPUTER-READABLE STORAGE MEDIUM, INFORMATION PROCESSING APPARATUS, AND INFORMATION PROCESSING METHOD

(71) Applicant: FUJITSU LIMITED, Kawasaki-shi, Kanagawa (JP)

(72) Inventor: Sébastien Picard, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/036,050

(22) Filed: Jul. 16, 2018

(65) Prior Publication Data

US 2019/0025911 A1    Jan. 24, 2019

(30) Foreign Application Priority Data

Jul. 19, 2017  (JP) .................. 2017-140049

(51) Int. Cl.
| | | |
|---|---|---|
| *G06F 3/01* | (2006.01) | |
| *G06F 3/0481* | (2013.01) | |
| *G06F 3/0484* | (2013.01) | |
| *H04N 13/383* | (2018.01) | |

(52) U.S. Cl.
CPC ............ *G06F 3/013* (2013.01); *G06F 3/0481* (2013.01); *G06F 3/04845* (2013.01); *H04N 13/383* (2018.05)

(58) Field of Classification Search
CPC ............................... G06F 3/013; G06F 3/0481
USPC ..................... 345/156; 1/1; 351/222; 715/65
See application file for complete search history.

(56) References Cited

U.S. PATENT DOCUMENTS

| | | | |
|---|---|---|---|
| 10,074,031 B2* | 9/2018 | Krenzer | ............ G06K 9/00335 |
| 2006/0087618 A1* | 4/2006 | Smart | .................... A61B 3/005 |
| | | | 351/222 |
| 2010/0002072 A1 | 1/2010 | Nagai | |
| 2010/0189354 A1 | 7/2010 | de Campos et al. | |
| 2011/0298702 A1 | 12/2011 | Sakata et al. | |
| 2013/0091515 A1 | 4/2013 | Sakata et al. | |
| 2014/0213930 A1* | 7/2014 | Mori | .................... G06K 9/0061 |
| | | | 600/558 |
| 2014/0250395 A1* | 9/2014 | Tanaka | .................... G06F 3/013 |
| | | | 715/765 |
| 2016/0042240 A1 | 2/2016 | Takeda et al. | |
| 2016/0109945 A1* | 4/2016 | Kempinski | ............. G06F 3/013 |
| | | | 348/78 |
| 2017/0032214 A1* | 2/2017 | Krenzer | ............ G06K 9/00335 |

(Continued)

FOREIGN PATENT DOCUMENTS

| | | |
|---|---|---|
| JP | 2010-014836 A | 1/2010 |
| JP | 2012-113450 A | 6/2012 |

(Continued)

*Primary Examiner* — Prabodh M Dharia
(74) *Attorney, Agent, or Firm* — Fujitsu Patent Center

(57) ABSTRACT

A non-transitory computer-readable storage medium that causes a computer to execute a process, the process including detecting a gaze position of a user to a screen of a display device, determining a distribution width for the gaze distribution information based on the detected gaze position or display information displayed, on the screen, in proximity of the gaze position, and outputting a gaze distribution information generated in accordance with the distribution width, the gaze distribution information indicating a degree of attention of the user on the screen.

8 Claims, 17 Drawing Sheets

(56) References Cited

U.S. PATENT DOCUMENTS

| | | | |
|---|---|---|---|
| 2017/0224210 A1 | 8/2017 | Mori et al. | |
| 2017/0344112 A1* | 11/2017 | Wilson | G06K 9/00 |
| 2017/0353716 A1* | 12/2017 | Shin | H04N 13/327 |
| 2017/0358141 A1* | 12/2017 | Stafford | G02B 27/017 |
| 2018/0131902 A1* | 5/2018 | Rosenberg | H04N 7/15 |

FOREIGN PATENT DOCUMENTS

| | | |
|---|---|---|
| JP | 2014-155635 A | 8/2014 |
| WO | 2011/074198 A1 | 6/2011 |
| WO | 2012/105196 A1 | 8/2012 |
| WO | 2015/064080 A1 | 5/2015 |
| WO | 2016/052646 A1 | 4/2016 |

* cited by examiner

How are you doing?
Extrinsic trait.
Thin is a red hat. here is a black ball

NON-TRANSITORY COMPUTER-READABLE STORAGE MEDIUM, INFORMATION PROCESSING APPARATUS, AND INFORMATION PROCESSING METHOD

CROSS-REFERENCE TO RELATED APPLICATION

This application is based upon and claims the benefit of priority of the prior Japanese Patent Application No. 2017-140049, filed on Jul. 19, 2017, the entire contents of which are incorporated herein by reference.

FIELD

The embodiments discussed herein are related to a non-transitory computer-readable storage medium, an information processing apparatus, and an information processing method.

BACKGROUND

The degree of attention (interest) of a user to (in) display information displayed on a screen of a display apparatus is sometimes checked using a heat map.

It is considered that the degree of attention of a user to display information and the line-of-sight position in the screen have a close relationship to each other, and it has been proposed to create a heat map in which a gaze time period is represented by a change in color for each line-of-sight position (for example, refer to International Publication Pamphlet Nos. WO 2011/074198, WO 2012/105196, WO 2015/064080, and WO 2016/052646). Since this visualizes a corresponding relationship between display information displayed on the screen of the display apparatus and the gaze time period, information gazed for a long period of time and information gazed for a short period of time by the user may be identified from each other.

SUMMARY

According to an aspect of the embodiments, a non-transitory computer-readable storage medium that causes a computer to execute a process, the process including detecting a gaze position of a user to a screen of a display device, determining a distribution width for the gaze distribution information based on the detected gaze position or display information displayed, on the screen, in proximity of the gaze position, and outputting a gaze distribution information generated in accordance with the distribution width, the gaze distribution information indicating a degree of attention of the user on the screen.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 is a view depicting display information displayed on a screen of a display apparatus of an information processing apparatus of a second embodiment disclosed herein;

DESCRIPTION OF EMBODIMENTS

Incidentally, even if a user directs its line of sight to display information displayed on the screen of a display apparatus, the user may not necessarily pay attention to the display information. For example, in the case where the user is distracted to talking voice heard from the surroundings, the attention of the user may not be paid to the display information at the line-of-sight position in the screen.

In such a case as just described, it is difficult to accurately examine the degree of attention of the user to the display information displayed on the screen based on the line-of-sight position on the screen of the display apparatus.

Therefore, according to one aspect, the technology disclosed herein is directed to generation of a gaze degree distribution that accurately indicates a degree of attention of a user to display information displayed on the screen of a display apparatus.

In the following, preferred embodiments of an information processing apparatus disclosed herein are described with reference to the drawings. It is to be noted that the technical scope of the present disclosure is the embodiments, besides covers the invention described in the claims and equivalencies to the disclosure.

Figure 1:
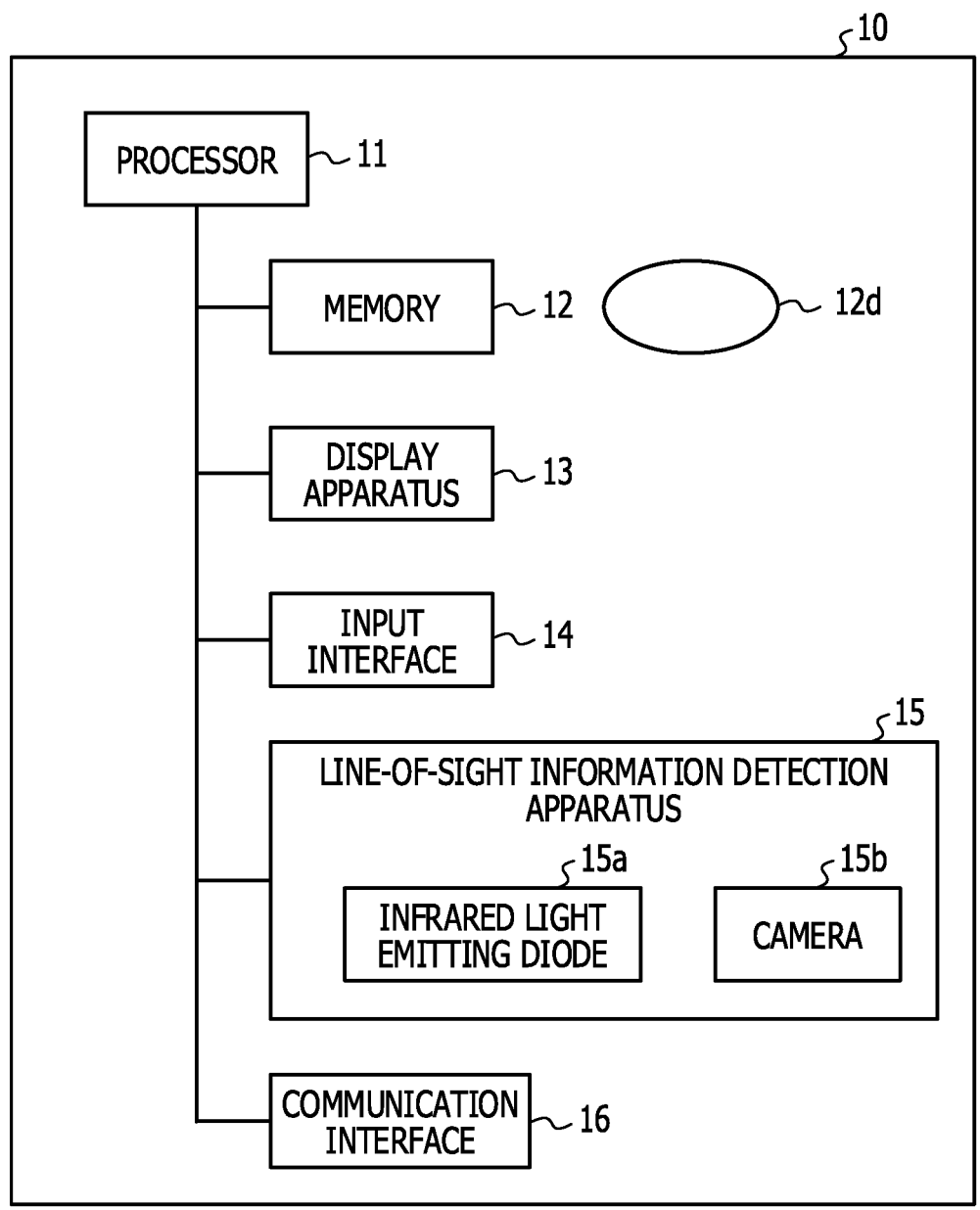
FIG. 1 is a view depicting an embodiment of an information processing apparatus disclosed herein.

FIG. 1 is a view depicting an embodiment of an information processing apparatus disclosed herein.

An apparatus 10 includes a processor 11, a memory 12, a display apparatus 13, an input interface 14, a line-of-sight information detection apparatus 15, and a communication interface 16. The processor 11 is an example of a processing unit or a processing apparatus. The memory 12 is an example of a storage unit or a storage apparatus.

The information processing apparatus (hereinafter referred to merely also as apparatus) 10 of the present embodiment displays display information on the screen of the display apparatus 13, and determines, for each line-of-sight position (gaze position) of a user, a weight and a distribution width for a gaze degree distribution indicative of a degree of attention to generate a gaze degree distribution. In the present embodiment, the line-of-sight position of the user is an intersecting point between the line of sight of the user and the screen of the display unit.

Even if the line of sight of the user is directed to display information displayed on the screen of the display apparatus 13, the attention of the user may not necessarily be directed to the display information. For example, in the case where the user is distracted to talking voice heard from the surroundings, the attention of the user may not be directed to the display information to which the line of sight of the user is directed. Further, after the user gazes and reads the display information, the user will perform a mental activity for recalling information stored by the user itself from within the read information. Also when such a mental activity is being performed, the attention of the user is not sometimes directed to the screen.

One of characteristics of the user in the case where the attention of the user is not directed to display information to which the line of sight is directed is that the eyes of the user are not focused on the screen. Further, it is considered that the degree of attention of the user is influenced by the degree of difficulty in visual recognition of display information such as the size and font of characters, degrees of difficulty of words, the size of an image, a defocus amount hereinafter described and so forth.

Based on the degree of difficulty in visual recognition of the display information described hereinabove, the apparatus 10 determines, for each intersecting point between the line of sight of the user and the screen of the display unit, a weight and a distribution width for a gaze degree distribution representative of a degree of attention to generate a gaze degree distribution to the screen.

Since the user may acquire a degree of attention of the user itself to the display information of the screen, the user may use the degree of attention as information, for example, for creating an effective advertisement. Further, since a portion of the display information of the screen read by the user to which the user pays attention and another portion of the display information to which the user pays no attention are visualized, the user may use its own degree of attention to the display information of the screen as a reference for recognition of the degree of attention of the user itself to the display information of the screen.

An example of a gaze degree distribution generated by the apparatus 10 is described below with reference to FIGS. 3A and 3B.

Figure 3A:
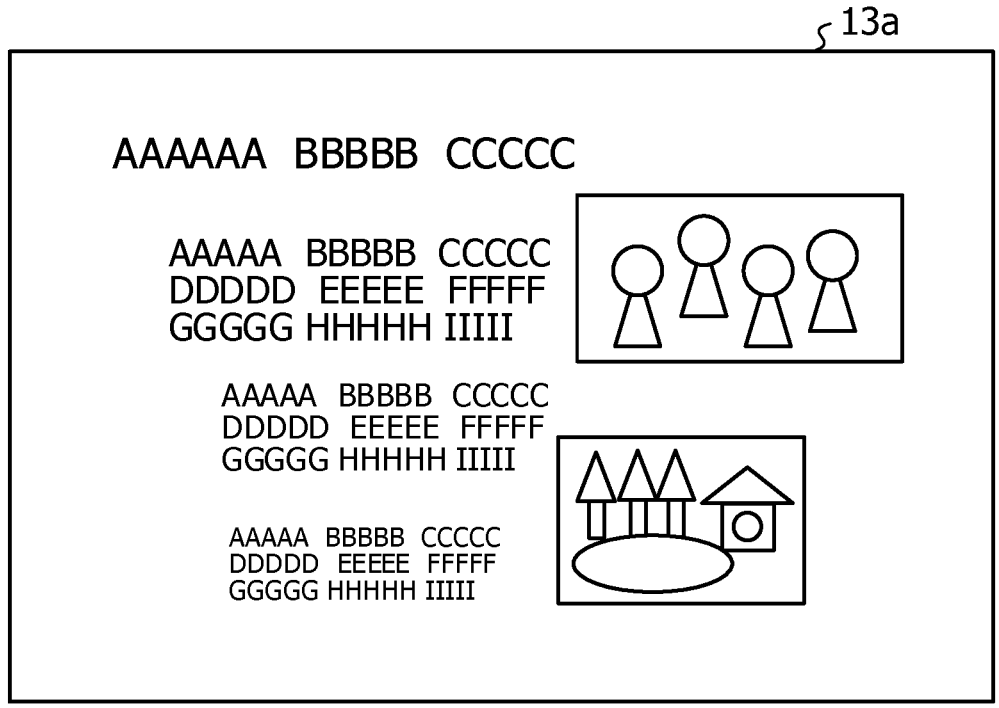
FIG. 3A is a view depicting display information displayed on a screen of a display apparatus.

FIG. 3A depicts display information displayed on a screen 13a of the display apparatus 13. The display information includes sentences including characters having various sizes, an image indicative of a plurality of persons and an image indicative of a landscape.

Figure 3B:
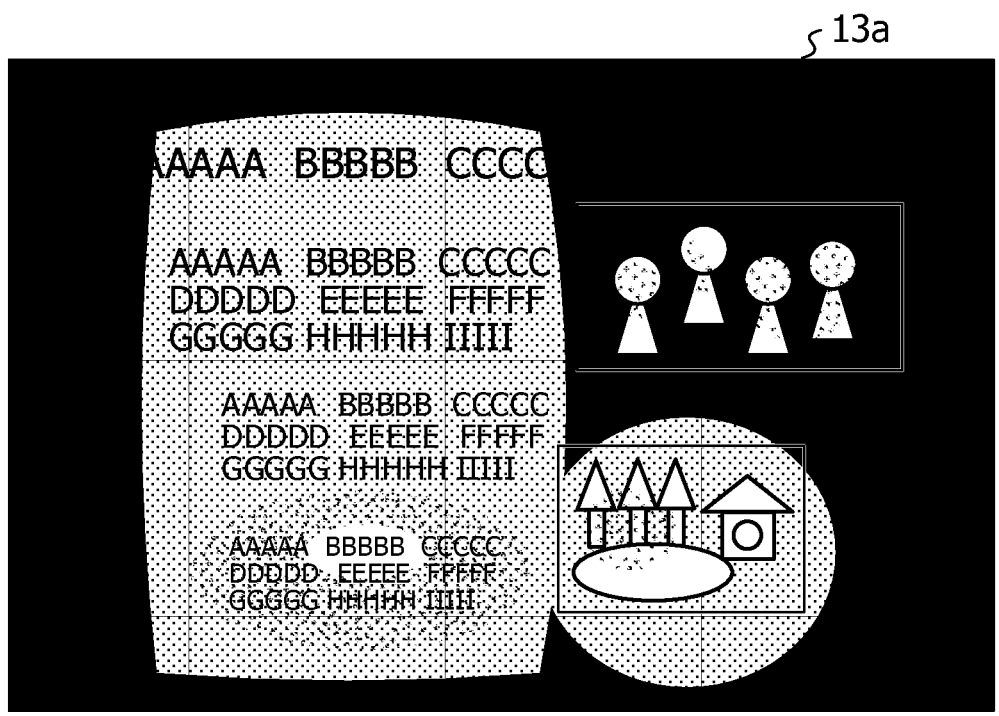
FIG. 3B is a view depicting a screen in which a gaze degree distribution is displayed in a superimposed relationship with display information.

FIG. 3B represents a gaze degree distribution for each intersecting point between the line of sight of the user and the screen of the display unit, which is generated when the user directs its line of sight to the screen 13a, as a heat map in a superimposed relationship with the display information on the screen 13a. The heat map is created by changing, in a gaze degree distribution having a level and an extent of the gaze degree for each intersecting point, the color depending upon the level of the gaze degree at the intersecting point.

As a function representative of a gaze degree distribution, for example, a two-dimensional Gaussian distribution function may be used.

A gaze degree distribution function represented using a two-dimensional Gaussian distribution function is represented, for example, by the expression (1) given below:

$$f(x, y) = w(x, y)\exp \left\{-\frac{1}{2(1-\rho^2)}\left(\frac{(x-\mu_x)^2}{\sigma_x^2} - 2\rho\frac{(x-\mu_x)(y-\mu_y)}{\sigma_x\sigma_y} + \frac{(y-\mu_y)^2}{\sigma_y^2}\right)\right\} \quad (1)$$

$$\rho = \frac{\sigma_{xy}^2}{\sigma_x^2\sigma_y^2} \quad (2)$$

Here, x and y indicate an intersecting point on the screen, and $\sigma_x$ and $\sigma_y$ are diagonal components of a distributed covariance matrix and $\sigma_{xy}$ is a non-diagonal component of the distributed covariance matrix. $\sigma_x$ is a standard deviation in the x-axis direction of a gaze degree distribution and is an index indicative of a distribution width in the x-axis direction. $\sigma_y$ is a standard deviation in the y-axis direction of the gaze degree distribution and is an index indicative of a distribution width in the y-axis direction. In the present specification, $\sigma_x$ and $\sigma_y$ are hereinafter referred to also as distribution width of a gaze degree distribution function. Further, in the present specification, w(x, y) is referred to also as weight for the gaze degree distribution function.

Figure 4:
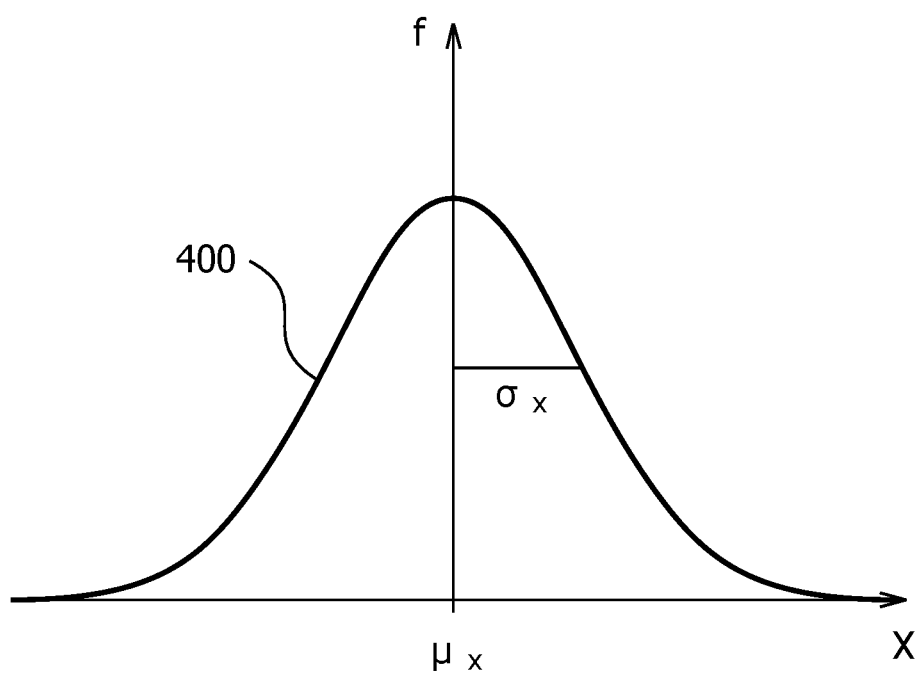
FIG. 4 depicts a gaze degree distribution in an x-axis direction.

A gaze degree distribution function 400 in the x axis direction indicates a normal distribution as depicted in FIG. 4.

When the apparatus 10 creates a heat map, since it makes a maximum value of the gaze degree distribution function correspond to a maximum value of the color map, the apparatus 10 does not use a normalization factor.

In the apparatus 10, w(x, y) and $\sigma_x$ and $\sigma_y$ are determined in response to the degree of attention to the intersecting point between the line of sight of the user and the screen of the display unit. It is to be noted that, in the related art, w(x, y) and $\sigma_x$ and $\sigma_y$ are fixed.

In a portion of the screen at which the attention density of the user is high, values of adjacent gaze degree distribution functions overlap with each other, and the color at the intersecting point is determined by the sum of values of the plurality of gaze degree distribution functions overlapping with each other on the heat map.

Further, in the apparatus 10, the weight w(x, y) and the distribution widths $\sigma_x$ and $\sigma_y$ of the gaze degree distribution function described above are determined based on display information to be displayed at the intersecting point or in the proximity of the intersecting point. In the present embodiment, the proximity of an intersecting point signifies the proximity of the line-of-sight position of the user.

Here, the proximity of an intersecting point may include a visible range by peripheral vision of the eyes of the user when the central vision of the eyes of the user is directed to the intersecting point.

The apparatus 10 detects line-of-sight information representative of the line-of-sight direction of the user using the line-of-sight information detection apparatus 15. The line-of-sight information includes an image including the eyes of the user. Further, the apparatus 10 determines, based on the line-of-sight information, gaze information including a line-of-sight direction of the user, an intersecting point between the line of sight of the user and the screen of the display unit, a gaze time period within which the user gazes the inside of a given region including the intersecting point and so forth. The gaze information is information detected together with line-of-sight information by the line-of-sight information detection apparatus when the user directs the line of sight toward the intersecting point.

In this manner, the apparatus 10 determines a weight and/or a distribution width for a gaze degree distribution function based on gaze information and display information displayed at or in the proximity of a plurality of intersecting points of the user on the screen.

For example, the apparatus 10 determines a defocus amount based on the difference between the distance between the eyes of the user and the screen 13a and the distance from the eyes of the user to the focus of the eyes of the user based on the gaze information. Then, the apparatus 10 determines a blur amount of characters or a blur amount of an image based on the defocus amount to determine a weight and/or a distribution width for a gaze degree distribution function. Then, the apparatus 10 determines a weight and/or a distribution width for a gaze degree distribution function based on the blur amount of characters or the blur amount of an image and the display information displayed at or in the proximity of the intersecting point of the user on the screen.

Now, it is described below with reference to FIGS. 5A to 5C that the apparatus 10 determines a defocus amount based on the difference between the distance between the eyes of the user and the screen 13a and the distance from the eyes of the user to the focus of the eyes of the user based on the gaze information and determines a blur amount of characters based on the defocus amount.

Figure 5A:
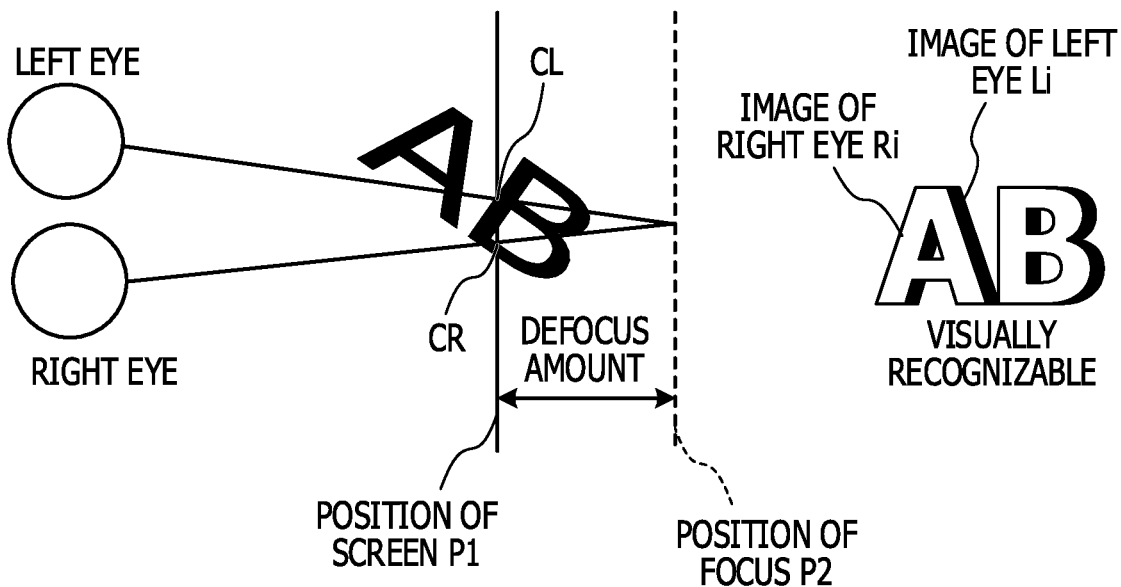
FIG. 5A is a view illustrating a defocus amount in the case where a character of a large size is viewed.
Figure 5B:
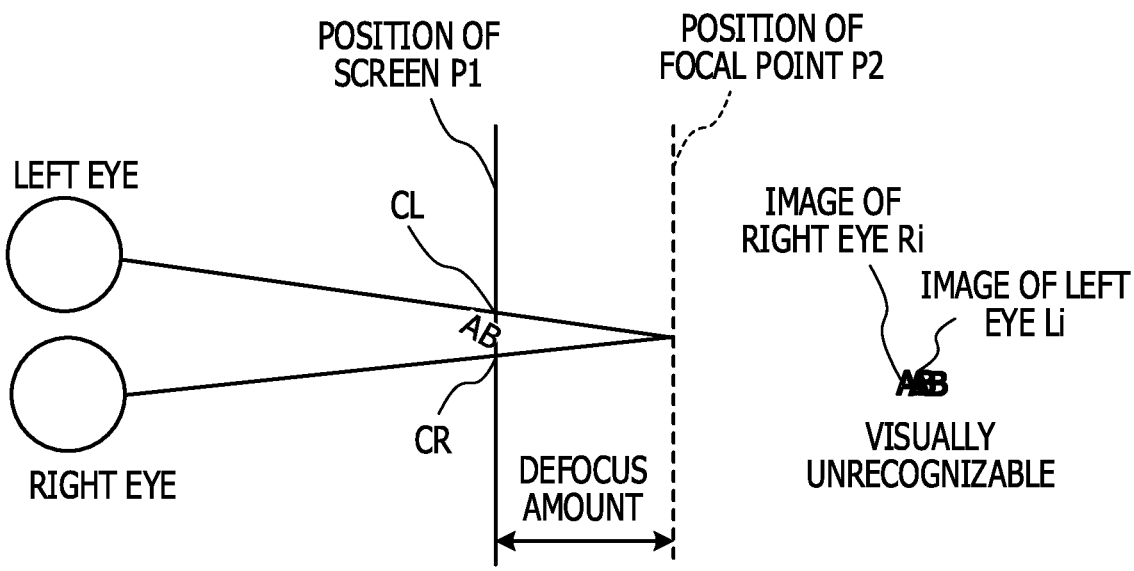
FIG. 5B is a view illustrating a defocus amount in the case where a character of a small size is viewed.

FIG. 5A is a view illustrating a defocus amount in the case where a character of a large size is viewed, and FIG. 5B is a view illustrating a defocus amount in the case where a character of a small size is viewed.

Characters "AB" are displayed on the screen 13a of the display apparatus 13 of the apparatus 10. The user directs the line of sight toward the characters "AB" on the screen 13a with both eyes. The apparatus 10 may acquire the line-of-sight directions of the left and right eyes of the user using the line-of-sight information detection apparatus 15 described hereinabove.

In the case where both eyes of the user are not focused at a position P1 of the screen 13a, a defocus amount appears as a difference between a position P2 of the focus and the position P1 on the screen 13a.

Figure 5C:
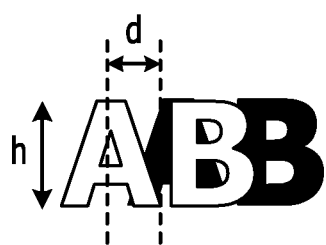
FIG. 5C is a view illustrating a blur amount.

In the case where the defocus amount is not zero, an image displacement amount d appears between a character image Ri of the characters reflected on the right eye of the user and a character image Li of the characters reflected on the left eye as depicted in FIG. 5C. The apparatus 10 determines an intersecting point CR at which the line of sight of the right eye and the screen 13a intersect with each other and an intersecting point CL at which the line of sight of the left eye and the screen 13a intersect with each other, and determines the distance between the two intersecting points as the image displacement amount d.

The apparatus 10 determines, as depicted in the expression (3) given below, the quotient (d/h) obtained by dividing the image displacement amount d by a height h of the characters as a blur amount of the screen as viewed from the user. The image "AB" of the characters on the screen as viewed from the user is an overlapping image of the image Ri of the characters reflected on the right eye of the user at the intersecting point CR and the character image Li of the characters reflected on the left eye at the intersecting point CL.

$$\text{Blur amount of characters} = d/h \quad (3)$$

With respect to the display information displayed at the intersecting point CR at which the line of sight of the right eye and the screen 13a intersect with each other, the display information displayed at the intersecting point CL at which the line of sight of the left eye and the screen 13a intersect with each other is display information displayed in the proximity of the intersecting point CR. Conversely, with respect to the display information displayed at the intersecting point CL at which the line of sight of the left eye and the screen 13a intersect with each other, the display information displayed at the intersecting point CR at which the line of sight of the right eye and the screen 13a intersect with each other is display information displayed in the proximity of the intersecting point CL.

In the present embodiment, the display information displayed at the intersecting point CL at which the line of sight of the left eye and the screen 13a intersect with each other with respect to the display information displayed at the intersecting point CR at which the line of sight of the right eye and the screen 13a intersect with each other is represented as display information displayed in the proximity of the intersecting point CR.

In the present embodiment, the proximity of the intersecting point CR includes a range of the intersecting point CR to the image displacement amount d.

The image displacement amount d is a value independent of the size of characters displayed on the screen 13a.

Accordingly, even if defocus amounts are equal to each other as depicted in FIGS. 5A and 5B, the blur amount (d/h) of the image of the characters in the case where the character size is small is greater than that in the case in which the character size is great, and therefore, the characters of a small size is difficult to visually recognize.

It is to be noted that, if the focuses of both eyes of the user coincide with the position P1 of the screen 13a, the focuses are an intersection position (line-of-sight position) on the screen 13a, and since there is no displacement between the character image Ri of the characters reflected on the right eye of the user and the character image Li of the characters reflected on the left eye, no blur of the characters occurs.

However, since the user may not necessarily focus on all display information on the screen 13a of the display apparatus 13 to gaze the display information, it is considered that a blur of the characters usually appears at least at part of the display information displayed on the screen 13a.

Now, hardware components of the apparatus 10 are described below in detail.

The processor 11 includes one or a plurality of arithmetic circuits and peripheral circuits. The processor 11 performs control and various processes of the hardware components of the apparatus 10 in accordance with a given program 12a stored in advance in the memory 12 and utilizes the memory 12 in order to temporarily save data produced during the processing.

The memory 12 may include a semiconductor memory such as a random access memory (RAM), a read only memory (ROM) or the like or a nonvolatile memory such as a magnetic disk, a flash memory or the like. Further, the memory 12 may include a drive (not depicted) that may read out a program stored in a non-transitory storage medium 12d.

Figure 2A:
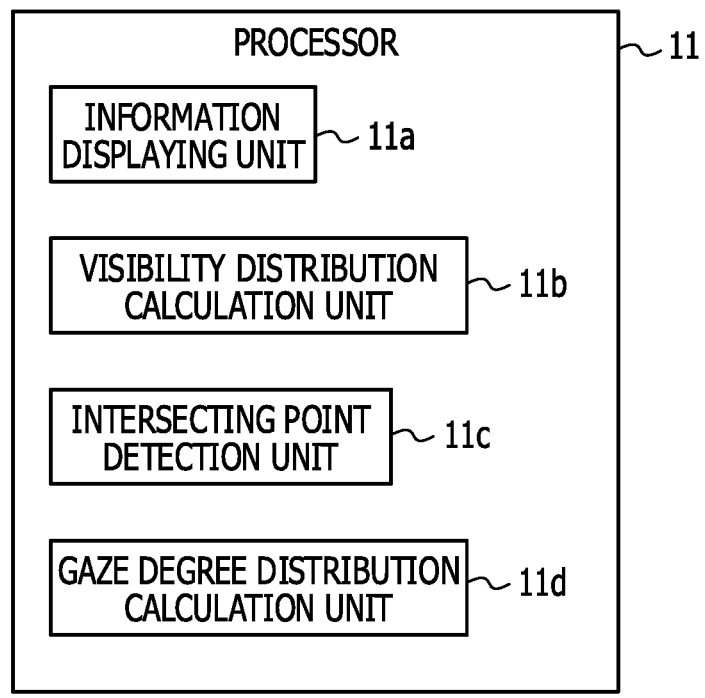
FIG. 2A is a view illustrating a processor.
Figure 2B:
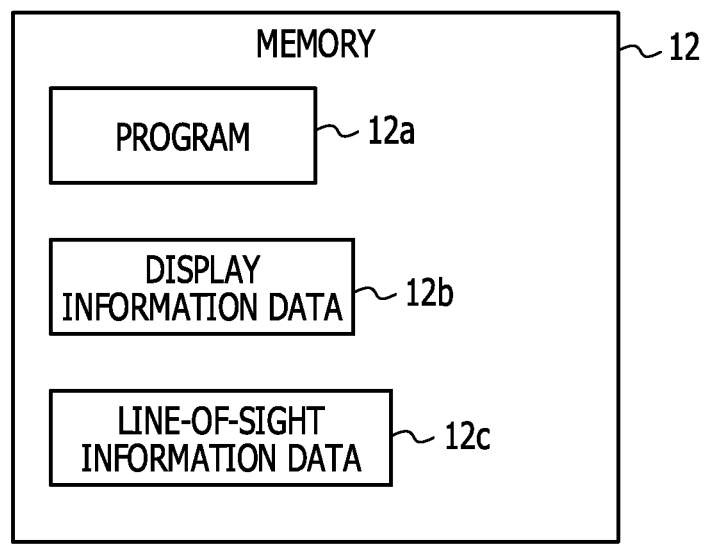
FIG. 2B is a view illustrating a memory.

As depicted in FIG. 2B, the memory 12 stores display information data 12b including display information to be displayed on the display apparatus 13 and line-of-sight information data 12c including acquired line-of-sight information of the user together with the given program 12a. The display information data 12b includes also information of a position that is associated with the display information and at which the display information is displayed on the screen of the display apparatus 13.

Further, the memory 12 stores various kinds of data to be utilized to detect an intersecting point between the line of sight of the user and the screen of the display unit. For example, the memory 12 stores a reference table representative of a relationship between the relative position of the center of gravity of a pupil to the center of gravity of a Purkinje image and the line-of-sight direction of the user. Further, the memory 12 stores images of the eyes of the user obtained from the line-of-sight information detection apparatus 15 or raw coordinates, acquisition order and so forth of measurement points of intersecting points before calibration detected based on the images. Further, the memory 12 stores an average range of the image displacement amount as viewed from the user who uses the apparatus 10.

The display apparatus 13 may display various kinds of information involved in operation of the apparatus 10 on the screen thereof under the control of the processor 11. For the display apparatus 13, for example, a liquid crystal display may be used.

The input interface 14 may be operated by the user of the apparatus 10 to input an operation. In the apparatus 10, for example, a keyboard or a mouse as the input interface 14 may be used. Further, a touch panel in which the input interface 14 and the display apparatus 13 are integrated may be used as the input interface 14.

The line-of-sight information detection apparatus 15 is disposed around the display apparatus 13 and generates measurement data (line-of-sight information) representative of the line-of-sight direction of the user in every given period (for example, 1 to 33 milliseconds). The line-of-sight information detection apparatus 15 outputs the generated measurement data to the processor 11.

For example, the line-of-sight information detection apparatus 15 includes an infrared light emitting diode 15a and a camera 15b that includes an image sensor having a sensitivity to infrared rays such as a charge-coupled device (CCD) image sensor or a complementary metal-oxide semiconductor (CMOS) image sensor and an image pickup optical system. In the line-of-sight information detection apparatus 15, an image that represents the pupils of the eyes of the user and corneal reflex images (hereinafter referred to as Purkinje images) when light emitted from the infrared light emitting diode 15a is reflected by the corneas is generated as measurement data by the camera 15b.

In the present embodiment, the line-of-sight information detection apparatus 15 is disposed above, below or to the side of the display apparatus 13 such that it is directed toward the user opposing to the display apparatus 13. The infrared light emitting diode 15a the line-of-sight information detection apparatus 15 includes illuminates the eyes of the user. Then, an image with the overall face or part of the face of the user including both eyes of the user that view the display apparatus 13 is generated by the camera 15b the line-of-sight information detection apparatus 15 includes.

The communication interface 16 performs transmission and reception of information, for example, through a network not depicted. The communication interface 16 includes a communication circuit and a communication line that perform transmission and reception. The apparatus 10 may transmit and receive, for example, a program, display information data or line-of-sight information data using the communication interface 16.

As depicted in FIG. 2A, the processor 11 described above includes an information displaying unit 11a, a visibility distribution calculation unit 11b, an intersecting point detection unit 11c, and a gaze degree distribution calculation unit 11d.

The respective units the processor 11 includes are function modules implemented by a computer program that operates, for example, on the processor 11. It is to be noted that the respective units the processor 11 includes may be incorporated as separate circuits from each other in the apparatus 10.

The information displaying unit 11a reads out display information data stored in the memory 12 and displays the display information data at a given position on the screen 13a of the display apparatus 13.

The visibility distribution calculation unit 11b creates a visibility distribution indicative of a degree of difficulty in visual recognition of display information at individual positions on the screen 13a of the display apparatus 13 based on the display information displayed on the screen 13a.

The intersecting point detection unit 11c determines a line-of-sight direction of the user based on line-of-sight information detected by the line-of-sight information detection apparatus 15 and determines an intersecting point between the line of sight of the user and the screen 13a of the display unit based on the line-of-sight direction of the user.

The gaze degree distribution calculation unit 11d determines a weight and/or a distribution width for a gaze degree distribution based on the visibility distribution and the display information displayed at and/or in the proximity of the intersecting point between the line of sight of the user and the screen 13a of the display unit to generate a gaze degree distribution function.

Figure 6:
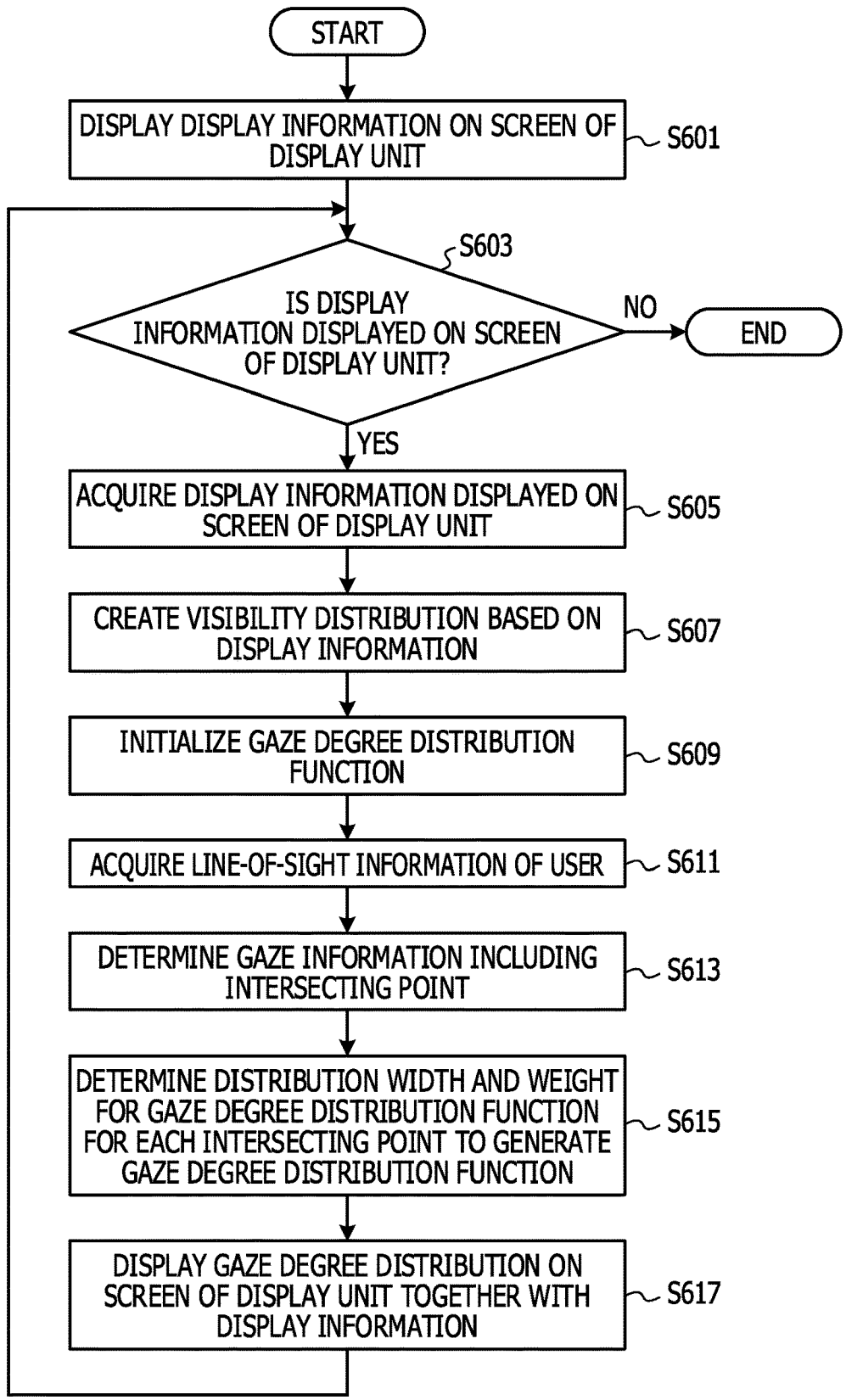
FIG. 6 is a flow chart (part 1) illustrating operation of an information processing apparatus of a first embodiment disclosed herein.

Now, operation of the first embodiment of the apparatus 10 described above is described below with reference to a flow chart depicted in FIG. 6.

Figure 7A:
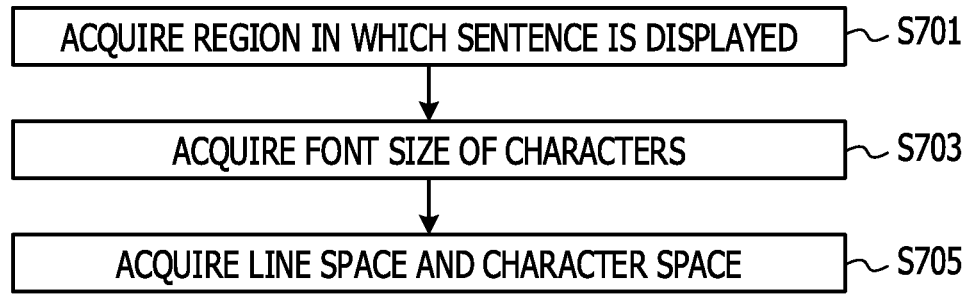
FIG. 7A is a flow chart (part 2) illustrating operation of an information processing apparatus of the first embodiment disclosed herein.
Figure 7B:
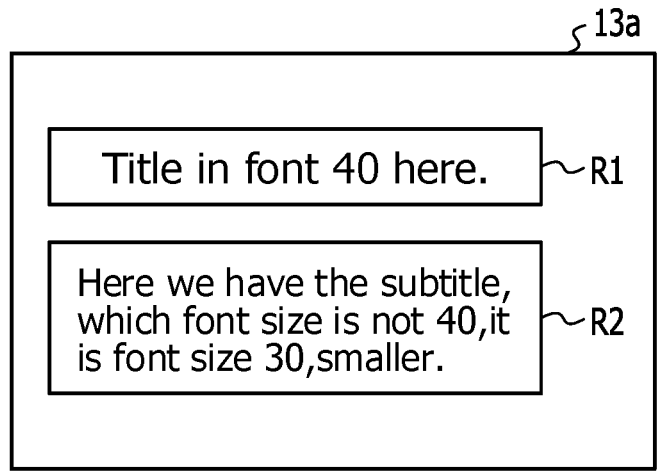
FIG. 7B is a view illustrating a process at step S701 of FIG. 7A.

First at step S601, the information displaying unit 11a of the processor 11 reads out the display information data 12b stored in the memory 12 and displays display information at a given position of the screen 13a of the display apparatus 13. For example, the information displaying unit 11a displays display information that is such character information as depicted in FIG. 7B on the screen 13a of the display apparatus 13.

Then at step S603, the visibility distribution calculation unit 11b of the processor 11 decides whether or not display information is displayed on the screen 13a of the display apparatus 13. For example, the visibility distribution calculation unit 11b receives a notification that display information is displayed on the screen 13a of the display apparatus 13 from the information displaying unit 11a to decide whether or not display information is displayed on the screen 13a of the display apparatus 13.

In the case where the visibility distribution calculation unit 11b decides that display information is displayed on the screen 13a of the display apparatus 13 (Yes at step S603), it acquires display information displayed on the screen 13a of the display apparatus 13 (step S605). On the other hand, in the case where the visibility distribution calculation unit 11b decides that display information is not displayed on the screen 13a of the display apparatus 13 (No at step S603), the apparatus 10 ends its processing.

Now, the process at step S605 is described below with reference to a flow chart depicted in FIG. 7A.

First at step S701, the visibility distribution calculation unit 11b acquires a region in which a character (image) is displayed on the screen 13a. The visibility distribution calculation unit 11b receives, from the information displaying unit 11a, information of characters (images) displayed on the screen 13a, positions in the screen 13a at which the characters (images) are displayed, a size of the characters, a line space and a character space of the character string. It is to be noted that the visibility distribution calculation unit 11b may receive a font of the characters, color information (R, G, B) of pixels that form the characters (images) and so forth as the information of the characters displayed on the screen 13a from the information displaying unit 11a. A position in the screen 13a of the display apparatus 13 is represented by a two-dimensional coordinate system that has the origin, for example, at the position of a pixel in the left upper corner and has an x axis in the horizontal direction and a y axis in the vertical direction. It is to be noted that the description given above regarding acquisition of information of images of characters from the information displaying unit 11a by the visibility distribution calculation unit 11b is suitably applied also to operation of the visibility distribution calculation unit 11b for acquiring information of an image other than the characters from the information displaying unit 11a.

As depicted in FIG. 7B, the visibility distribution calculation unit 11b acquires a region R1 and another region R2 in the screen 13a as regions in which characters are displayed based on the information received from the information displaying unit 11a.

Figure 7C:
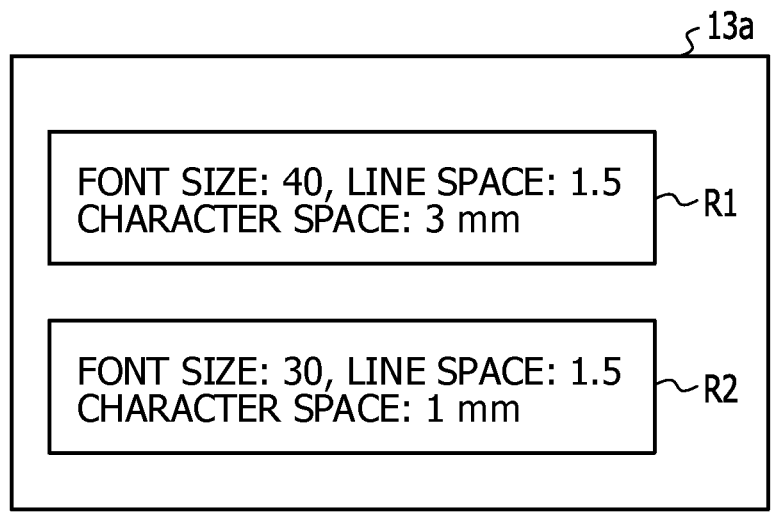
FIG. 7C is a view illustrating processes at steps S703 and S705 of FIG. 7A.

Then at step S703, the visibility distribution calculation unit 11b acquires a size of the characters in the region R1 and a size of the characters in the region R2 as depicted in FIG. 7C based on the information received from the information displaying unit 11a.

Then at step S705, the visibility distribution calculation unit 11b acquires a line space and a character space of the character string in the region R1 and a line space and a character space of the character string in the region R2 as depicted in FIG. 7C based on the information received from the information displaying unit 11a.

The details of the process at step S605 are such as described above.

Then at step S607, the visibility distribution calculation unit 11b generates a visibility distribution indicative of degrees of difficulty in visual recognition to the display information based on the acquired display information.

Details of the process at step S607 are described below.

The visibility distribution calculation unit 11b acquires an average range of the image displacement amount dr, stored in the memory 12, as viewed from the user who uses the apparatus 10. Then, the visibility distribution calculation unit 11b determines an estimated blur amount of a screen as viewed from the user in regard to images of two adjacent characters using the expression (3) given hereinabove based on the image displacement amount dr and the display information acquired at step S605. Then, the visibility distribution calculation unit 11b obtains a relationship between the character blur amount and the image displacement amount dr in regard to a range in which the image displacement amount dr is average.

Figure 8A:
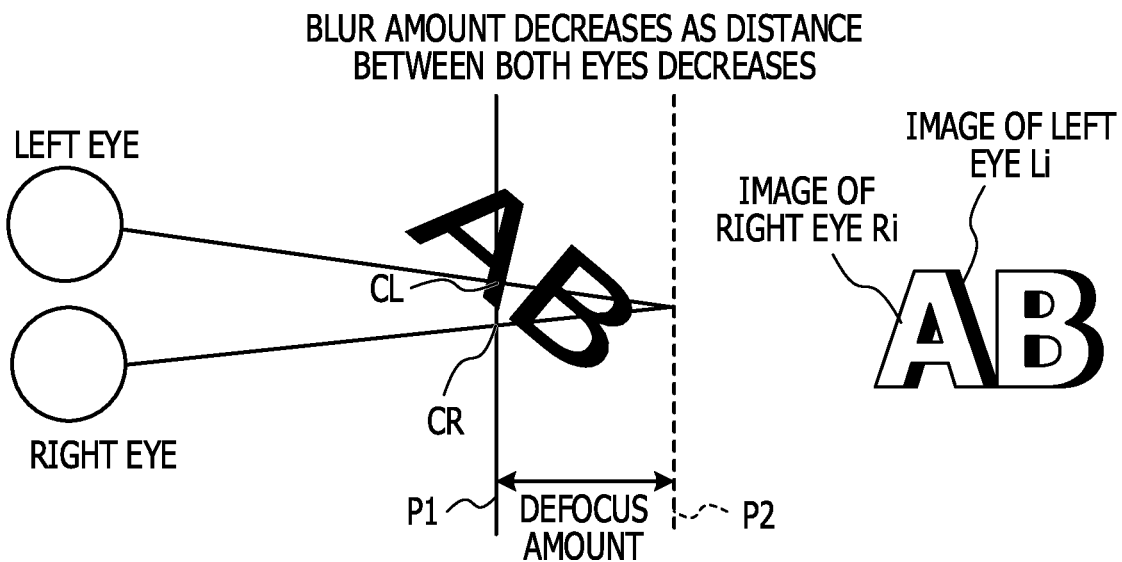
FIG. 8A is a view illustrating a blur amount in the case where distance between both eyes is small.
Figure 8B:
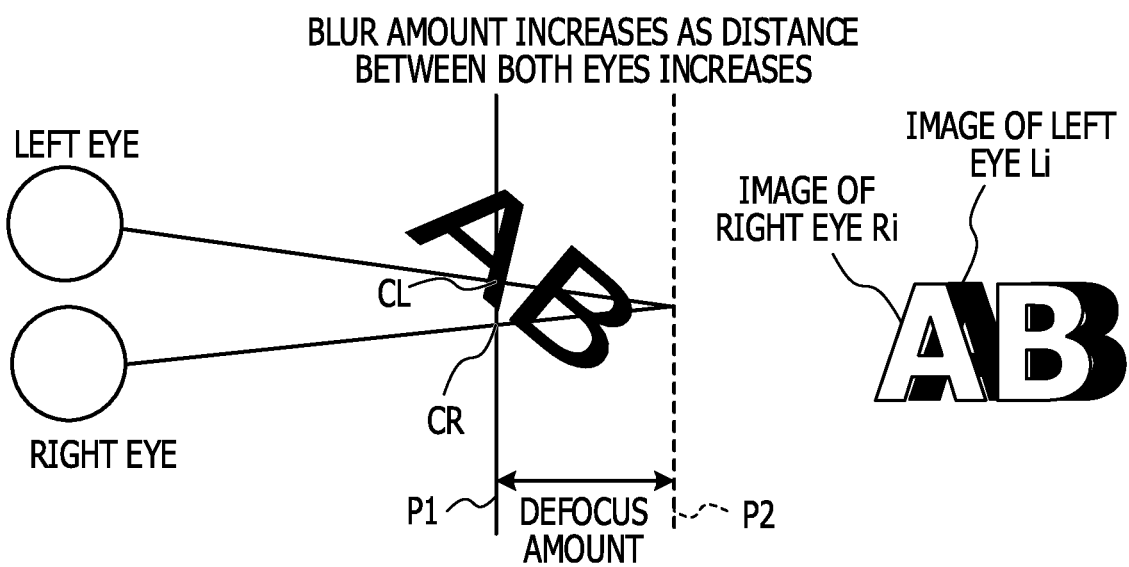
FIG. 8B is a view illustrating a blur amount in the case where distance between both eyes is great.

In regard to the estimated blur amount of the screen as viewed from the user, where the distance between the binocular faces of the user is small, the character blur amount is small as depicted in FIG. 8A, and where the distance between the binocular faces of the user is long, the character blur amount is great as depicted in FIG. 8B.

Thus, the visibility distribution calculation unit 11b determines the visibility at each position of the screen 13a on which the display information is displayed based on the relationship between the character blur amount and the image displacement amount dr. The visibility is a value estimated to make display information invisible if the character blur amount becomes higher than the same. The visibility may be determined based on, for example, a character size, a character font, a character space and so forth.

The visibility distribution calculation unit 11b generates a visibility distribution having a visibility at each position of the screen 13a in this manner.

The process at step S607 is such as described above.

Then at step S609, the visibility distribution calculation unit 11b sets the distribution widths $\sigma_x$ and $\sigma_y$ of the gaze degree distribution function and the weight w(x, y) for the gaze degree distribution function to their initial values to initialize the gaze degree distribution function.

Then at step S611, the intersecting point detection unit 11c of the processor 11 acquires line-of-sight information of the user using the line-of-sight information detection apparatus 15. The line-of-sight information detection apparatus 15 picks up a plurality of images including the eyes of the user.

Then at step S613, the intersecting point detection unit 11c of the processor 11 determines an intersecting points of the line of sight of the user and the screen 13a of the display unit for each of a plurality of images (line-of-sight information). Further, the intersecting point detection unit 11c may determine a gaze pattern indicative of a time-dependent movement of an intersecting point. The intersecting point detection unit 11c may estimate the degree of attention of the user to the display information by checking for the presence or absence of reading back of the display information, for example, based on gaze pattern.

In the following, operation of the intersecting point detection unit 11c for determining an intersecting point at which the line of sight of the user and the screen 13a intersect with each other for each of a plurality of images (line-of-sight information) is described in detail.

The intersecting point detection unit 11c detects, every time the processor 11 acquires an image from the line-of-sight information detection apparatus 15, a region in which the eyes of the user are reflected on the image and detects a Purkinje image and the pupils within the region within which the eyes are reflected. Then, the intersecting point detection unit 11c detects an intersecting point at which the line of sight of the user and the screen 13a intersect with each other based on the positional relationship between the Purkinje image and the center of gravity of the pupils.

The intersecting point detection unit 11c first detects a region in which the eyes are reflected. The luminance of a pixel corresponding to an eye is much different from the luminance of a pixel corresponding to the surroundings of the eye. Therefore, the intersecting point detection unit 11c performs neighboring pixel difference arithmetic operation in the vertical direction using, for example, a Sobel filter for each pixel in the image to detect edge pixels that exhibit a luminance variation in the vertical direction. Then, the intersecting point detection unit 11c determines a region surrounded by two edge lines along each of which a given number or more of edge pixels are coupled so as to correspond to the size of an eye substantially in a horizontal direction as a region of an eye. Alternatively, the intersecting point detection unit 11c may detect, by template matching between a template representative of a picture of an eye on the image and the image, a region most coincident with the template in the image and determine the detected region as a region of an eye.

Further, the intersecting point detection unit 11c detects a region in which the pupil is reflected in the region of the eye. In the present embodiment, the intersecting point detection unit 11c performs template matching between a template corresponding to a pupil and a region of an eye and detects a region in which the coincidence degree with the template is highest within the region of the eye. Then, in the case where the highest value of the coincidence degree is higher than a coincidence degree threshold value, the intersecting point detection unit 11c decides that a pupil is reflected in the detected region.

Further, the luminance of a region in which a pupil is reflected is lower than the luminance in a surrounding region, and the pupil has a substantially elliptic shape. Therefore, the intersecting point detection unit 11c concentrically sets two rings having different radii in the region of the eye. Then, in the case where the difference value when an average in luminance of pixels on the inner side of the outer side ring is subtracted from an average value of pixels corresponding to the outer side ring is higher than a given threshold value, the intersecting point detection unit 11c may determine the region surrounded by the inner side ring as a pupil region. The intersecting point detection unit 11c calculates an average value of horizontal direction coordinate values and an average value of vertical direction coordinate values of the pixels included in the pupil region as coordinate values of the center of gravity of the pupil region.

Further, the intersecting point detection unit 11c detects a Purkinje image of the infrared light emitting diode 15a the line-of-sight information detection apparatus 15 includes within a region of each eye. The intersecting point detection unit 11c calculates an average value of horizontal direction coordinate values and an average value of vertical direction coordinate values of respective pixels included in the Purkinje image as coordinates of the center of gravity of the Purkinje image.

After the centers of gravity of the pupils and the centers of gravity of the Purkinje images are detected, the intersecting point detection unit 11c detects the line-of-sight direction of the user based on the detected centers of gravity.

Since the surface of the cornea has a substantially spherical shape, the positions of the Purkinje images of a light source the line-of-sight information detection apparatus 15 has is substantially fixed. On the other hand, the center of gravity of a pupil moves in response to the line-of-sight direction of the user. Therefore, the intersecting point detection unit 11c may detect the line-of-sight direction of the user by determining a relative position of the center of gravity of a pupil with respect to the center of gravity of a Purkinje image.

In the present embodiment, the intersecting point detection unit 11c determines a relative position of the center of gravity of a pupil with reference to the center of gravity of a Purkinje image, for example, by subtracting the horizontal direction coordinates and the vertical direction coordinates of the center of gravity of a Purkinje image from the horizontal direction coordinates and the vertical direction coordinates of the center of gravity of a pupil. Then, the intersecting point detection unit 11c specifies the line-of-sight direction of the user by referring to a reference table that represents a relationship between the relative position of the center of gravity of a pupil and the line-of-sight direction of a user.

After the line-of-sight direction of the user is detected, the intersecting point detection unit 11c detects intersecting points at which the lines of sight of both eyes of the user and the screen intersect with each other based on the line-of-sight direction of the user and a supposed positional relationship between the eyes of the user and the display apparatus 13. In the following, operation of the intersecting point detection unit 11c is described particularly.

In the present embodiment, the intersecting point detection unit 11c estimates the distances between the camera and both eyes of the user from the distance between both eyes of the user in the real space, the distance between both eyes of the user on the image, and the focal length of the camera. The intersecting point detection unit 11c estimates the positions in the real space of both eyes of the user from the directions and the distance from the camera to both eyes, which are determined from the positions of both eyes on the image. The intersecting point detection unit 11c estimates intersecting points of the lines of sight of both eyes of the user based on the positions in the real space of both eyes of the user and the line-of-sight directions as a focus (gaze position). The intersecting point detection unit 11c estimates an intersecting point between straight lines intercoupling both eyes of the user and the focus and the screen to detect an intersecting point at which the lines of sight of both eyes of the user and the screen intersect with each other.

The operation of the intersecting point detection unit 11c when it determines, for each of a plurality of images (line-of-sight information), an intersecting point at which a line of sight of a user and the screen 13a intersect with each other is such as described above.

Then at step S615, the gaze degree distribution calculation unit 11d of the processor 11 determines a distribution width and a weight for a gaze degree distribution function for each intersecting point on the screen 13a of the display apparatus 13 to generate a gaze degree distribution function.

Figure 9:
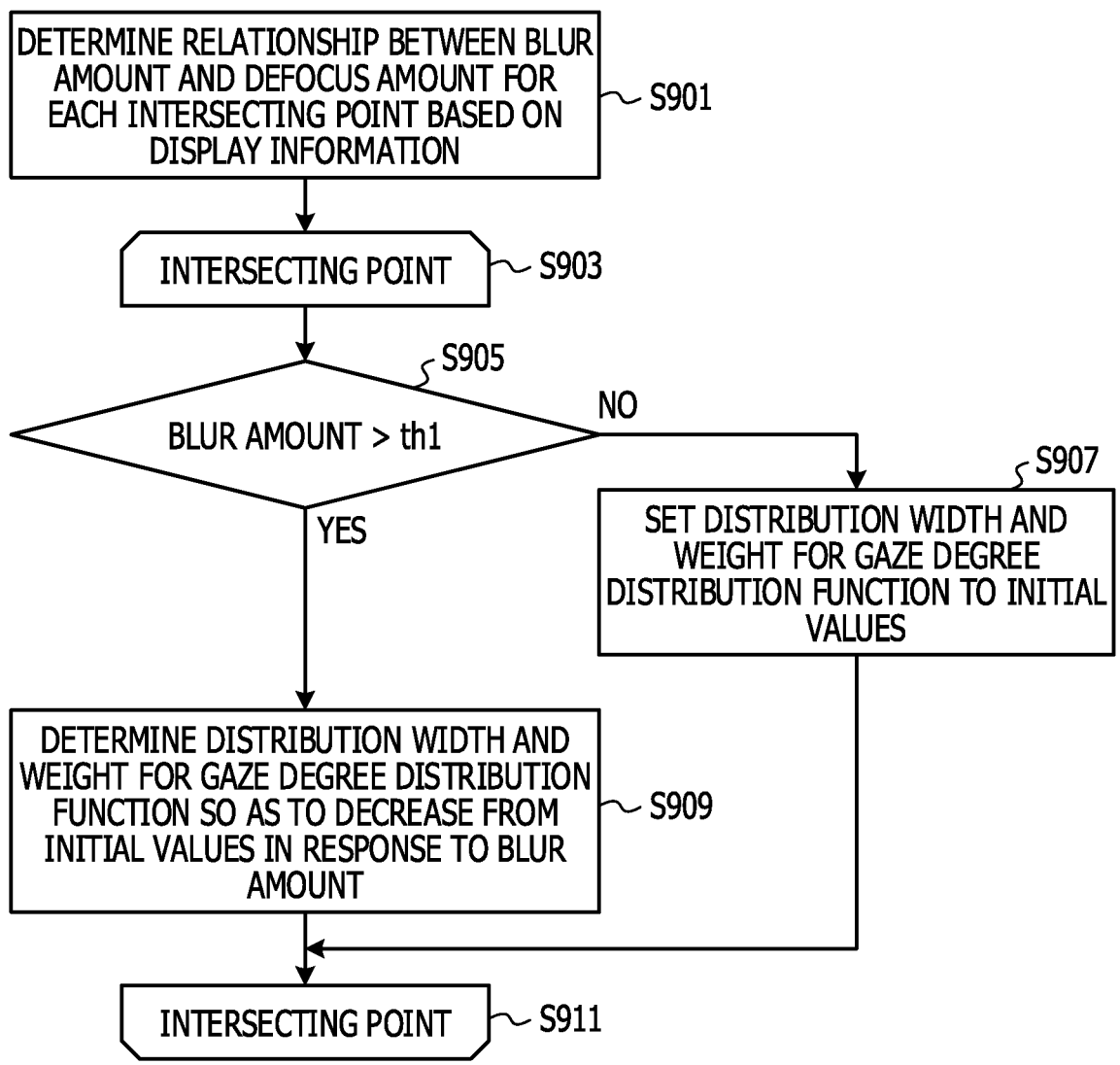
FIG. 9 is a flow chart (part 4) illustrating operation of an information processing apparatus of the first embodiment disclosed herein.

The process at step S615 is described below with reference to a flow chart depicted in FIG. 9.

At step S901, the gaze degree distribution calculation unit 11d determines, for each intersecting point on the screen 13a, an actual blur amount of the screen as viewed from the user based on the display information on the screen 13a. First, the gaze degree distribution calculation unit 11d determines, for each intersecting point, a defocus amount based on the distance between the eyes of the user and the screen 13a and the distance from the eyes of the user to the focus of the eyes of the user based on the gaze information. Then, the gaze degree distribution calculation unit 11d determines an actual image displacement amount d as viewed from the user using a method similar to that described hereinabove with reference to FIGS. 5A to 5C using the display information and the defocus amount. Then, the gaze degree distribution calculation unit 11d determines an actual blur amount of the screen as viewed from the user at the intersecting point using the expression (3) above based on the displacement amount d and the display information at the intersecting point.

Then, the gaze degree distribution calculation unit 11d performs processes at steps S903 to S911 for each intersecting point on the screen 13a.

At step S905, the gaze degree distribution calculation unit 11d decides whether or not the blur amount at the intersecting point on the screen 13a (actual blur amount of the screen as viewed from the user) is greater than a threshold value th1 (estimated blur amount of the screen as viewed from the user). Here, the threshold value th1 is a visibility at the intersecting point. The visibility is a value estimated to make display information, which is displayed at the intersecting point, invisible if the blur amount becomes higher than the same as described hereinabove.

The gaze degree distribution calculation unit 11d sets, in the case where the blur amount at the intersecting point is equal to or smaller than the threshold value th1 (No at step S905), the distribution width and the weight for a gaze degree distribution function at the intersecting point to their initial values. In the case where the blur amount at the intersecting point is equal to or smaller than the threshold value th1, it is estimated that the user is viewing the display information displayed at the intersecting point. For example, it is considered that the degree of attention of the user to the display information displayed at the intersecting point is high.

On the other hand, in the case where the blur amount at the intersecting point is greater than the threshold value th1 (Yes at step S905), the gaze degree distribution calculation unit 11d determines the distribution width and the weight for a gaze degree distribution function so as to be reduced from the initial values in response to the blur amount. For example, the distribution width and the weight may be determined so as to increase in proportion to a value obtained by dividing the blur amount by the threshold value th1. In the case where the blur amount at the intersecting point is greater than the threshold value th1, it is estimated that the user does not sufficiently view the display information displayed at the intersecting point. For example, it is considered that the degree of attention of the user to the display information displayed at the intersecting point is low.

A gaze degree distribution function is generated by repeating the processes at steps S903 to S911.

The process at step S615 is such as described above.

Then, at step S617, the gaze degree distribution calculation unit 11d displays the gaze degree distribution as a heat map based on the gaze degree distribution function together with the display information on the screen 13a of the display apparatus 13 as depicted in FIG. 3B.

With the apparatus 10 of the present embodiment described above, a gaze degree distribution that accurately indicates the degree of attention of the user to the display information displayed on the screen 13a of the display apparatus 13 may be generated as a heat map. Consequently, the degree of attention of the user to the display information may be visualized accurately.

Now, a different embodiment of operation of the information processing apparatus described above is described below with reference to FIGS. 10 to 17. To matters that are not described specifically in regard to the different embodiment, the detailed description of the first embodiment of the operation described above is suitably applied. Further, the same components are denoted by the same reference symbols.

First, operation of a second embodiment of the apparatus 10 is described below.

FIG. 10 is a view depicting display information displayed on the screen of a display apparatus of the information processing apparatus of the second embodiment disclosed herein.

Although the apparatus 10 of the present embodiment displays a sentence as display information on the screen 13a of the display apparatus 13, the manner of determination of a visibility distribution is different from that in the first embodiment described above.

While, also in the present embodiment, the apparatus 10 determines a gaze degree distribution function in accordance with the flow chart depicted in FIG. 6, processes at steps different from those in the first embodiment described above are described below.

First, processes at steps S601 to S603 are similar to those in the first embodiment described hereinabove.

Then at step S605, the visibility distribution calculation unit 11b acquires display information displayed on the screen 13a of the display apparatus 13. The visibility distribution calculation unit 11b receives, from the information displaying unit 11a, information of a word displayed on the screen 13a, the position in the screen 13a at which the word is displayed, and a size of characters from which the word is formed.

Then at step S607, the visibility distribution calculation unit 11b generates a visibility distribution indicative of a degree of difficulty of visual recognition of the display information based on the acquired display information.

Figure 11A:
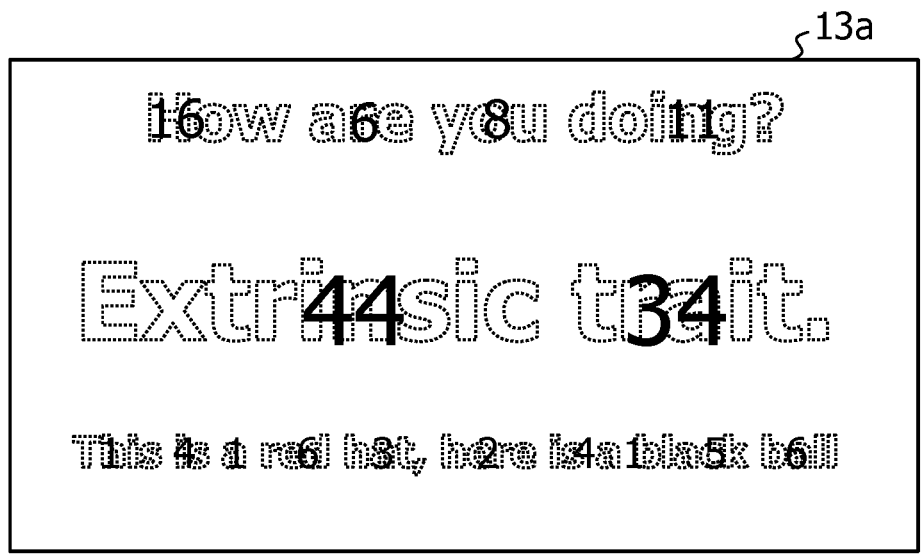
FIG. 11A is a view (part 1) illustrating a process for generating a visibility distribution.

First, as depicted in FIG. 11A, the visibility distribution calculation unit 11b determines a degree of difficulty of each of words that form the sentence displayed on the screen 13a. The degree of difficulty of a word is a frequency by which the word appears in general sentences. As the frequency decreases, the degree of difficulty has an increasing value and increases the degree of difficulty of the word. The visibility distribution calculation unit 11b refers to a table in which, for example, words stored in the memory 12 and degrees of difficulty of the words are associated with each other to determine the degree of difficulty of each word as a numerical value.

Figure 11B:
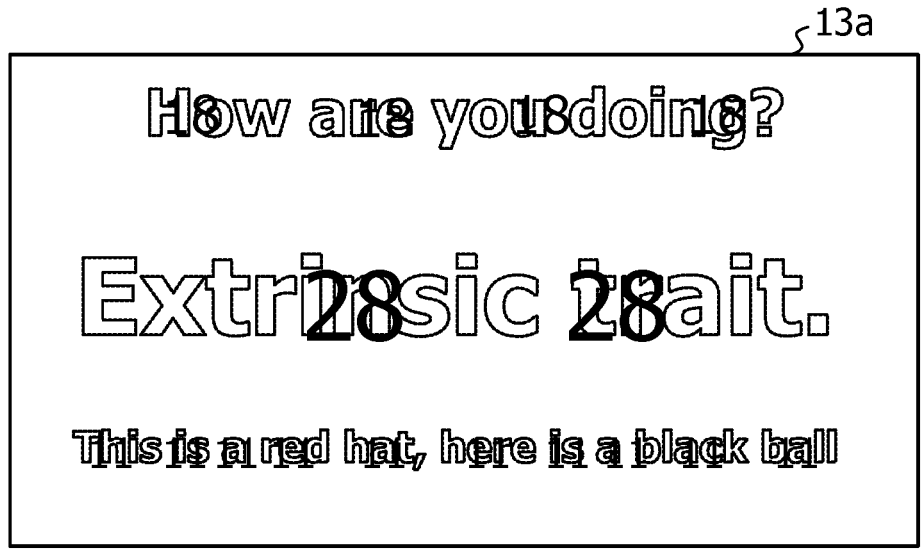
FIG. 11B is a view (part 2) illustrating a process for generating a visibility distribution.

Then, the visibility distribution calculation unit 11b determines a size of characters of each word that forms the sentence displayed on the screen 13a as depicted in FIG. 11B.

Then, the visibility distribution calculation unit 11b uses the expression (4) given below to determine a visibility V at a position at which each word is displayed on the screen 13a to generate a visibility distribution. The visibility V in a region in which no word is displayed is zero.

$$\text{Visibility}(V) = (\text{degree of difficulty of word})/(\text{size of character}) \times 100 \quad (4)$$

Figure 12:
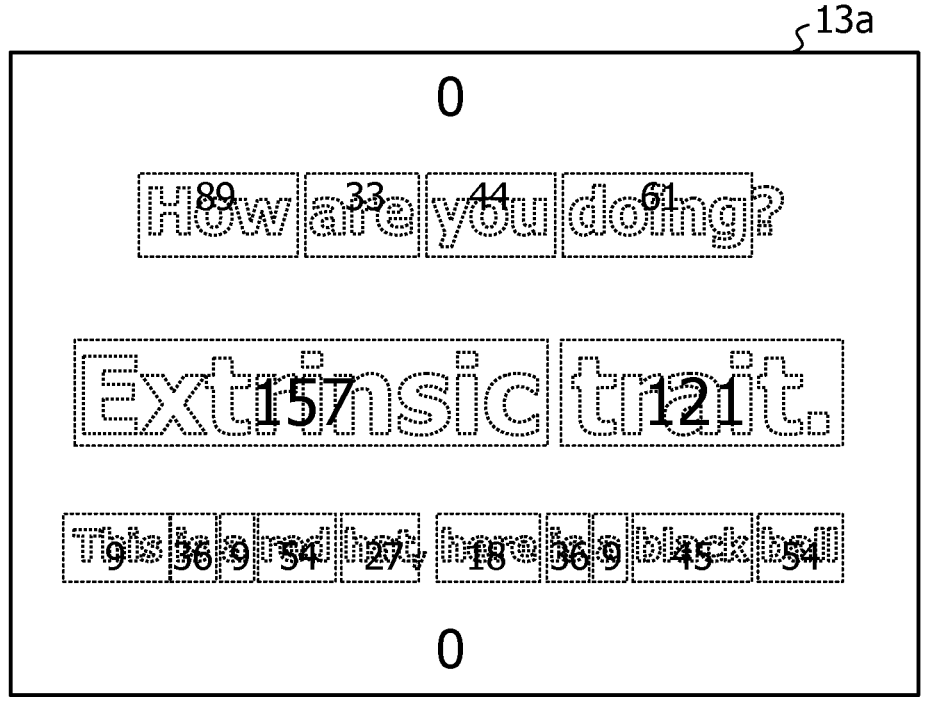
FIG. 12 is a view (part 3) illustrating a process for generating a visibility distribution.

FIG. 12 depicts a visibility distribution on the screen 13a. It is to be noted that the visibility distribution calculation unit 11b may otherwise determine a visibility distribution based on combinations of degrees of difficulty of the words (for example, the combination of degrees of difficulty of words "This is" is represented by the degree of difficulty of "This" and the degree of difficulty of "is").

Processes at steps S609 to S613 are similar to those in the first embodiment described hereinabove.

Then at step S615, the gaze degree distribution calculation unit 11d of the processor 11 determines a distribution width and a weight for a gaze degree distribution function for each position on the screen 13a of the display apparatus 13 to generate a gaze degree distribution function.

Figure 13:
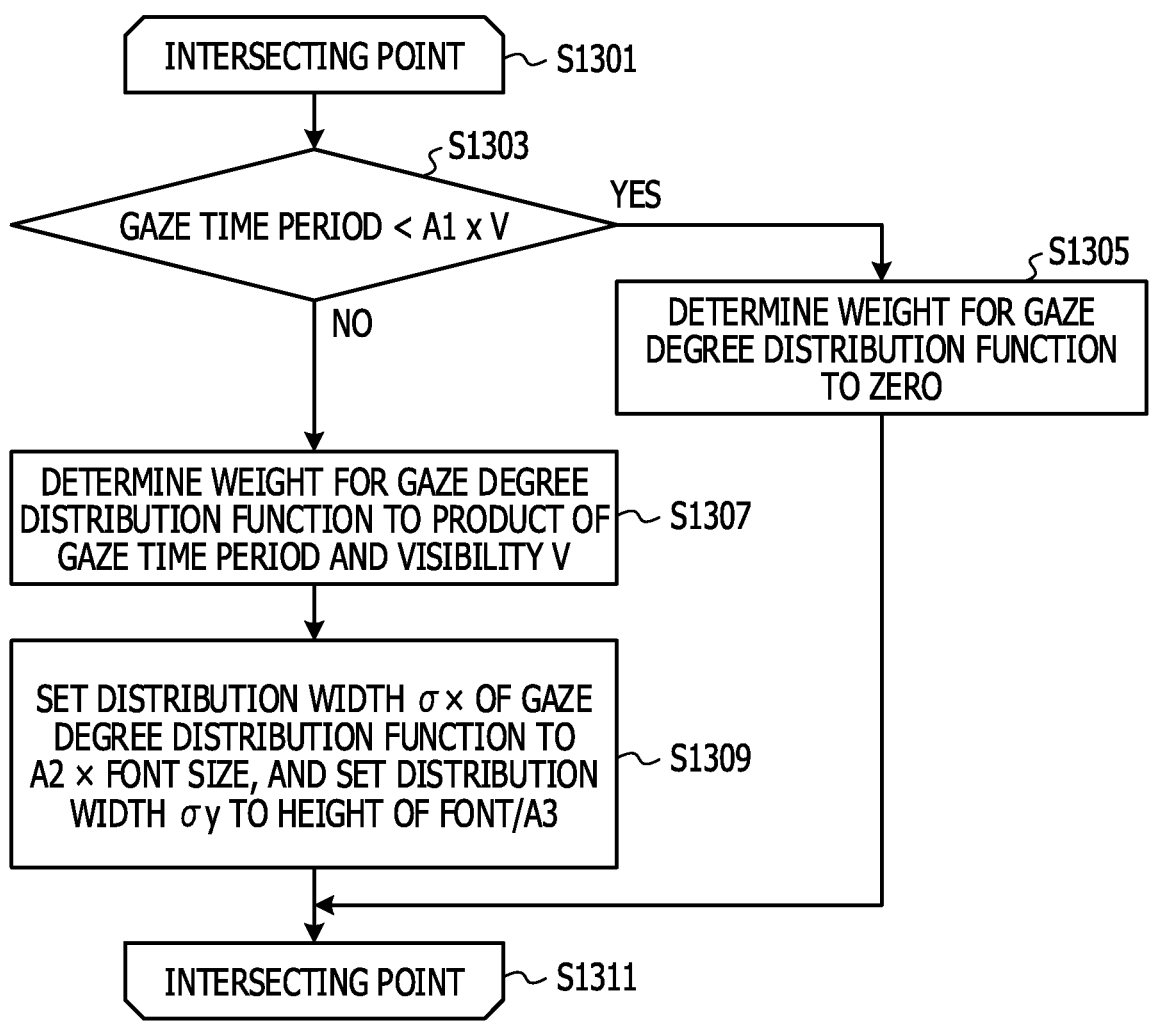
FIG. 13 is a flow chart illustrating operation of an information processing apparatus of the second embodiment disclosed herein.

The process at step S615 is described below with reference to a flow chart depicted in FIG. 13.

The gaze degree distribution calculation unit 11d performs processes at steps S1301 to S1311 for each intersecting point on the screen 13a.

At step S1303, the gaze degree distribution calculation unit 11d decides whether or not the gaze time period at the intersecting point is shorter than the product of a coefficient A1 and the visibility V of the intersecting point. The gaze time period of the user is ordinarily 100 to 500 milliseconds. The coefficient A1 may be determined such that the product of the coefficient A1 and the visibility V is greater than such a gaze time period. The gaze degree distribution calculation unit 11d may determine the gaze time period as the product of the number of images in which the user directs the line of sight continuously within a given region including the intersecting point and the image pickup interval of the images. Then, the gaze degree distribution calculation unit 11d uses the gaze time period determined for an intersecting point determined based on each of a plurality of images used to determine the gaze time period as a gaze time period for the intersecting point.

In the present embodiment, the proximity of an intersecting point includes a range visible by a peripheral vision of the eyes of the user when the central vision of the eyes of the user is directed to the intersecting point.

In the case where the gaze time period on the intersecting point is shorter than the product of the coefficient A1 and the visibility V of the intersecting point (Yes at step S1303), the weight for the gaze degree distribution function is determined to zero (step S1305). In the case where the gaze time period on the intersecting point is shorter than the product of the coefficient A1 and the visibility V of the intersecting point, it is estimated that the user does not sufficiently view the display information displayed at the intersecting point. For example, it is considered that the degree of the attention of the user to the display information displayed at the intersecting point is low. Then, the gaze degree distribution calculation unit 11d advances the processing to a next intersecting point.

On the other hand, in the case where the gaze time period on the intersecting point is equal to or longer than the product of the coefficient A1 and the visibility V of the intersecting point (No at step S1303), the gaze degree distribution calculation unit 11d determines the weight for the gaze degree distribution function at the intersecting point to the product of the gaze time period and the visibility V (step S1307). In the case where the gaze time period on the intersecting point is equal to or longer than the product of the coefficient A1 and the visibility V of the intersecting point, it is estimated that the user is viewing the display information displayed at the intersecting point. For example, it is considered that the degree of attention of the user to the display information displayed at the intersecting point is high.

Then at step S1309, the gaze degree distribution calculation unit 11d determines the distribution width $\sigma_x$ for a gaze degree distribution function the product of a coefficient A2 and the size of characters and determines the distribution width $\sigma_y$ to the quotient obtained by dividing the height of characters by a coefficient A3. The coefficient A2 may be determined such that $6\sigma_x$ covers the size of characters. The coefficient A3 may be determined such that $6\sigma_y$ covers the height of characters.

Gaze degree distribution functions are generated by repeating the processes at steps S1301 to S1311.

The process at step S615 is such as described above.

At step S617, a process similar to that in the first embodiment described hereinabove is executed.

With the apparatus 10 of the present embodiment described above, advantageous effects similar to those in the first embodiment described hereinabove may be achieved.

Now, operation of a third embodiment of the apparatus 10 is described below.

The present embodiment is different from the first embodiment described hereinabove in that the display information is an image (for example, a photograph or a picture) other than characters.

While, also in the present embodiment, the apparatus 10 determines a gaze degree distribution function in accordance with the flow chart depicted in FIG. 6, processes at steps different from those in the first embodiment described above are described below.

First, processes at steps S601 to S603 are similar to those in the first embodiment described hereinabove.

Then at step S605, the visibility distribution calculation unit 11b acquires the display information displayed on the screen 13a of the display apparatus 13. The visibility distribution calculation unit 11b receives the image displayed on the screen 13a and the position in the screen 13a at which the image is displayed from the information displaying unit 11a.

Then at step S607, the visibility distribution calculation unit 11b generates a visibility distribution indicative of the degree of difficulty in visual recognition of the display information based on the acquired display information.

Figure 14:
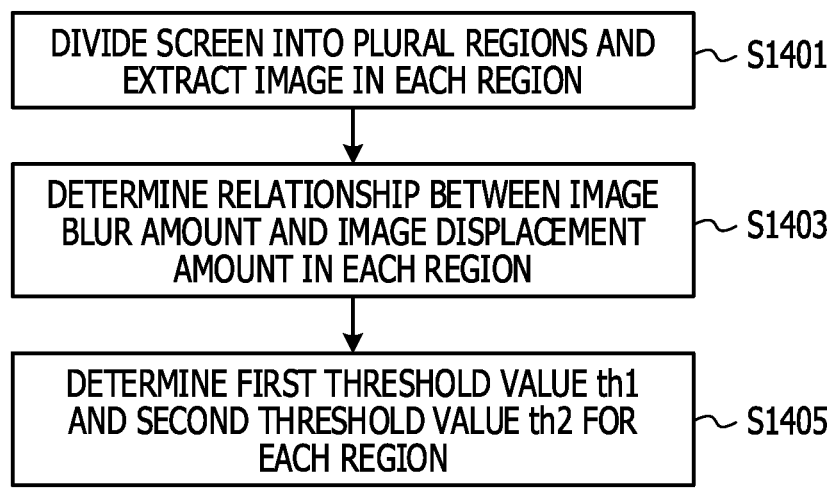
FIG. 14 is a flow chart (part 1) illustrating operation of an information processing apparatus of a third embodiment disclosed herein.

The process at step S607 is described below with reference to a flow chart depicted in FIG. 14.

Figure 15A:
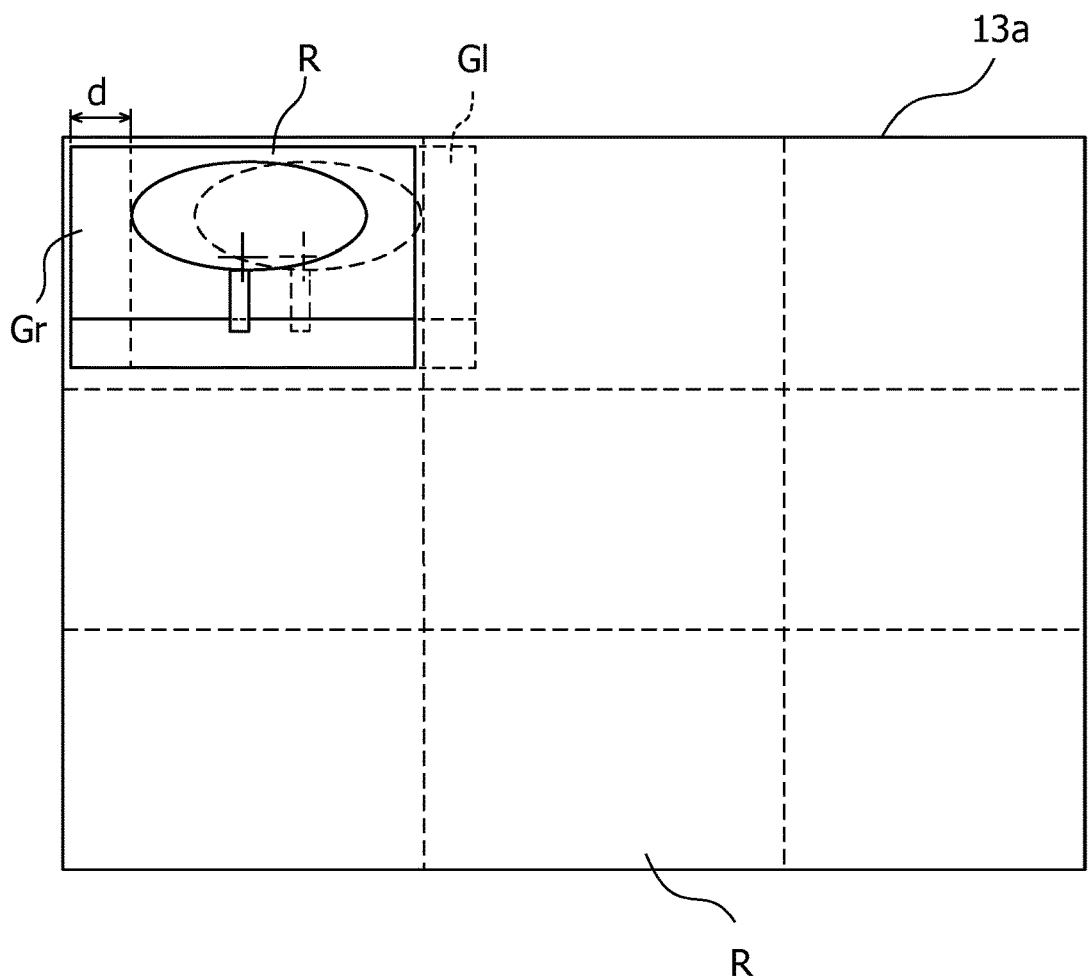
FIG. 15A is a view illustrating a process for generating a visibility distribution.

First at step S1401, as depicted in FIG. 15A, the visibility distribution calculation unit 11b divides the screen into a plurality of regions R and extracts an image in each region R. The size of one region may be, for example, 200 pixels×200 pixels.

Then at step S1403, the visibility distribution calculation unit 11b determines a blur amount ID of the image and the image displacement amount d in each region R.

As depicted in FIG. 15A, the visibility distribution calculation unit 11b determines a right eye image Gr and a left eye image Gl of the user in one region R. For example, the right eye image Gr is an image within a range viewable by a center vision and a peripheral vision at the center of the region R given by the intersecting point of the right eye (position of a cross mark on the left side). Then, the visibility distribution calculation unit 11b determines an image within a viewable range by a central vision and a peripheral vision at a position spaced by the displacement amount d in the horizontal direction from the intersecting point of the right eye as the intersecting point of the left eye of the user (position of a cross mark on the right side). The displacement amount d may be determined, for example, similarly as at step S801 of the first embodiment described hereinabove.

Then, the visibility distribution calculation unit 11b determines a blur amount ID of the image for each region R using the expression (5) given below. In the expression (5), $I_R(x, y)$ is a luminance at the position (x, y) of a pixel in the right eye image Gr and $I_L(X, y)$ is a luminance at the position (x, y) of a pixel in the left eye image Gl, and PN is a pixel number in the region R.

$$ID(d)=\Sigma_x\Sigma_y|I_L(x,y)-I_R(x,y)|/PN \tag{5}$$

Figure 15B:
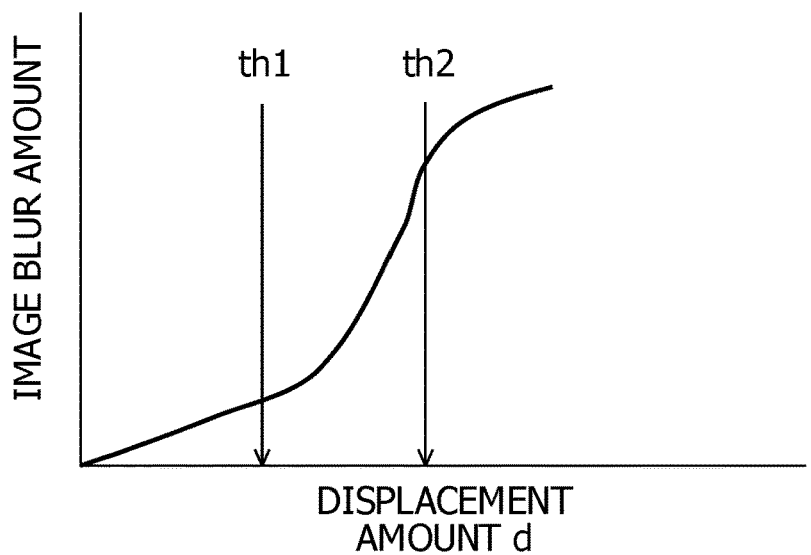
FIG. 15B is a view illustrating a process for determining a visibility based on a visibility distribution.

Thus, a relationship between the image blur amount ID and the image displacement amount d is obtained as depicted in a graph of FIG. 15B.

Then at step S1405, the visibility distribution calculation unit 11b determines a first threshold value th1 and a second threshold value th2 for each region R. The first threshold value th1 is a maximum blur amount with which the image in the region R may be viewed dearly. The second threshold value th2 is a blur amount that makes it difficult to view an image in the region R beyond the blur amount.

In order to determine the first threshold value th1, for example, edge detection is performed for the image in the region R to determine the position of an edge, and dimensions of the region surrounded by the edge are acquired. Then, a given ratio (for example, 1/10 to 3/10) of the dimensions of the region surrounded by the edge may be determined as the first threshold value th1. The second threshold value th2 may be set, for example, to a different given ratio (for example, 4/10 to 6/10) to the dimensions of the region surrounded by the edge.

Then, the visibility distribution calculation unit 11b generates a visibility distribution in which a visibility is given by the first threshold value th1 and the second threshold value th2 determined for each region R. In the present embodiment, the visibility distribution has two values of the first threshold value th1 and the second threshold value th2 as a visibility for each position of the screen.

Processes at steps S609 to S613 are similar to those in the first embodiment described hereinabove.

Then at step S615, the gaze degree distribution calculation unit 11d of the processor 11 determines a distribution width and a weight for a gaze degree distribution function for each position on the screen 13a of the display apparatus 13 to generate a gaze degree distribution function.

Figure 16:
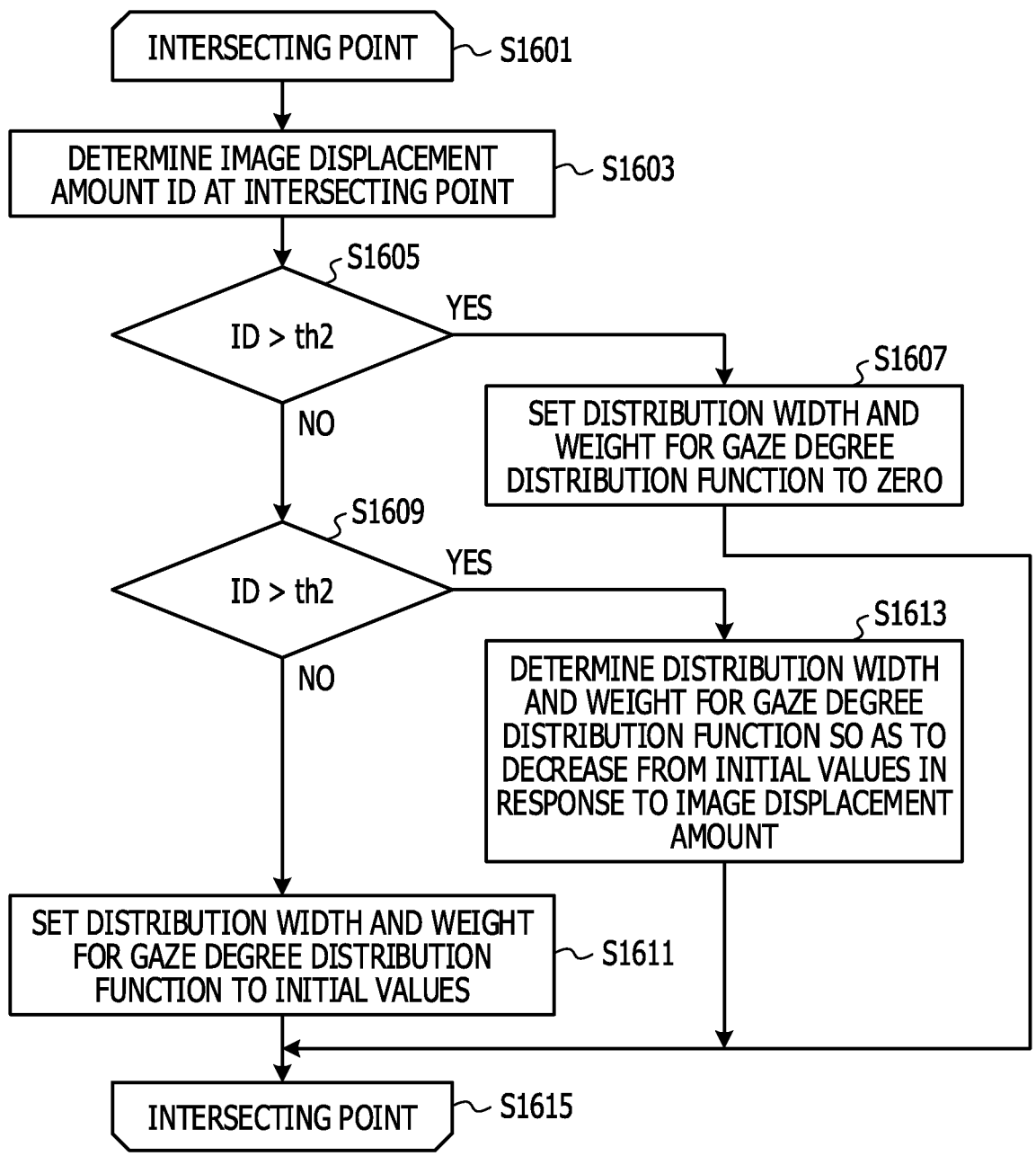
FIG. 16 is a flow chart (part 2) illustrating operation of an information processing apparatus of the third embodiment disclosed herein.

The process at step S615 is described below with reference to a flow chart depicted in FIG. 16.

The gaze degree distribution calculation unit 11d performs processes at steps S1601 to S1615 for each intersecting point between the line of sight of the user and the screen 13a.

First at step S1603, the gaze degree distribution calculation unit 11d determines an image blur amount ID at the intersecting point based on the display information and the gaze information including the intersecting point. The gaze degree distribution calculation unit 11d performs a process similar to that at step S1403 for each intersecting point between the line of sight of the user and the screen 13a to determine an image blur amount ID at the intersecting point.

Then at step S1605, the gaze degree distribution calculation unit 11d decides whether or not the image blur amount ID at the intersecting point (actual blur amount of the screen as viewed from the user) is greater than the second threshold value th2 (second blur amount estimated from the screen as viewed from the user). In the case where the image blur amount ID is greater than the second threshold value th2 (Yes at step S1605), the gaze degree distribution calculation unit 11d sets the distribution width and the weight for the gaze degree distribution function to zero (step S1607). In the case where the image blur amount ID is greater than the second threshold value th2, it is estimated that the user does not visually recognize the display information displayed at the intersecting point. For example, it is considered that the degree of attention to the display information displayed at the intersecting point is low. Then, the gaze degree distribution calculation unit 11d advances the processing for a next intersecting point.

On the other hand, where the image blur amount ID is equal to or smaller than the second threshold value th2 (No at step S1605), the gaze degree distribution calculation unit 11d decides whether or not the image blur amount ID at the intersecting point is greater than the first threshold value th1 (estimated first blur amount of the screen as viewed from the user) (step S1609). In the case where the image blur amount ID is equal to or smaller than the first threshold value th1 (No at step S1609), the gaze degree distribution calculation unit 11d sets the distribution width and the weight for the gaze degree distribution function at the intersecting point to their initial values (step S1611). In the case where the image blur amount ID is equal to or smaller than the first threshold value th1, it is estimated that the user sufficiently visually recognizes the information displayed at the intersecting point. For example, it is considered that the degree of attention of the user to the display information displayed at the intersecting point is high.

On the other hand, in the case where the image blur amount ID is greater than the first threshold value th1 (Yes at step S1607), the gaze degree distribution calculation unit 11d determines the distribution width and the weight for the gaze degree distribution function so as to be reduced from the initial values in response to the image blur amount (step S1613). In the case where the image blur amount ID is between the first threshold value th1 and the second threshold value th2, it is estimated that the user is visually recognizing the display information displayed at the intersecting point to some degree. For example, it is considered that the degree of attention of the user to the display information displayed at the intersecting point is a medium degree.

A gaze degree distribution function is generated by repeating the processes at steps S1601 to S1615.

The process at step S615 is such as described above.

The process at step S617 is similar to that in the first embodiment described above.

With the apparatus 10 of the present embodiment described above, similar advantageous effects to those by the first embodiment described hereinabove may be achieved.

Figure 17:
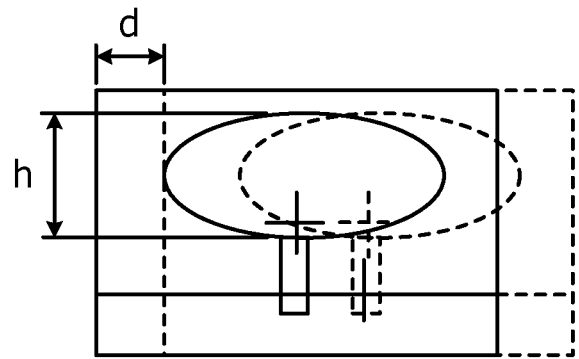
FIG. 17 is a view illustrating a modification to operation of an information processing apparatus of the third embodiment disclosed herein.

Further, in operation example of the apparatus 10 of the present embodiment, although the image blur amount ID (refer to the expression (5) above) is used in order to determine a visibility distribution and a gaze degree distribution, a blur amount of an image, which is not characters, may be defined by the expression (6) given below using the displacement amount d between images as viewed from the left and right eyes and the characteristic height h of the images as depicted in FIG. 17.

$$\text{Blur amount of image not of characters}=d/h \tag{6}$$

The method for determining a visibility distribution and a gaze degree distribution using a blur amount of an image that is not of characters as represented by the expression (6) above is similar to that by which a visibility distribution and a gaze degree distribution are determined using a blur amount of characters in the first embodiment described hereinabove.

In the present disclosure, the non-transitory computer-readable storage medium, information processing apparatus and information processing method described above may be altered suitably without departing from the subject matter of the present disclosure. Further, constituent features any embodiment has may be applied suitably also to the other embodiments.

For example, while, in the first and second embodiments of operation described above, the display information is characters and, in the third embodiment of operation, the display information is an image that is not characters, the display information may include characters and an image that is not characters. For example, when the visibility distribution calculation unit 11b and the gaze degree distribution calculation unit 11d receive display information displayed on the screen 13a from the information displaying unit 11a, they receive identification information indicative of whether the display information is information of characters or information of an image that is not characters. The visibility distribution calculation unit 11b and the gaze degree distribution calculation unit 11d may identify, based on the identification information, whether the display information is characters or an image that is not characters.

Examples and conditional language recited herein are intended for pedagogical purpose to help the reader in understanding the invention and the concepts contributed by the inventor for furthering the art, and may preferably be construed as being without limitation to specifically recited examples and conditions, nor does the organization of such examples in the specification relates to a showing of the superiority and inferiority of the present disclosure. Although the embodiments of the present disclosure have been described in detail, it may preferably be understood that the various changes, substitutions, and alterations could be made hereto without departing from the spirit and scope of the present disclosure.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable storage medium that causes a computer to execute a process, the process comprising:
    obtaining a plurality of images of eyes of a user facing a screen of a display device displaying a plurality of information;
    with respect to each of the plurality of images, detecting, based on an intersecting point between a line of sight of the user and the screen of the display device, a gaze position of the user in relation to the screen of the display device;
    determining a distribution width in accordance with a blur amount of information displayed on the display device at the detected gaze position for each of the plurality of images;
    generating a gaze distribution information in accordance with the distribution width, the gaze distribution information indicating a degree of attention of the user with respect to the detected gaze position for each of the plurality of images; and
    displaying the gaze distribution information on the screen of the display device together with the plurality of information.

2. The non-transitory computer-readable storage medium according to claim 1, wherein the process further comprises:
    determining, for each of the plurality of images, first distances and second distances, wherein the first distances correspond to a distance between the eyes of the user and the screen, and the second distances correspond to a distance between the eyes of the user and the gaze position of the user;
    determining, for each of the plurality of images, defocus amounts that are differences between the first distances and the second distances; and
    determining, for each of the plurality of the intersecting points corresponding to the plurality of images respectively, the distribution width for the gaze distribution information based on the defocus amount and the display information displayed at or in the proximity of the intersecting point on the screen.

3. The non-transitory computer-readable storage medium according to claim 1, wherein the process further comprises:
    determining, for each of the plurality of the intersecting points corresponding to the plurality of images respectively, a gaze time period within which the user continuously directs the gaze to a given region including each of the plurality of the intersecting points; and wherein
    the determining the distribution width further determines the distribution width for the gaze distribution information based on the gaze time period and the display information displayed at or in the proximity of each of the plurality of the intersecting points on the screen.

4. The non-transitory computer-readable storage medium according to claim 1, wherein the process further comprises:
    generating a visibility distribution information indicating a degree of difficulty in visual recognition of the display information at each of positions on the screen based on the display information; and wherein
    the determining the distribution width determines the distribution width, for each of the plurality of the intersecting points corresponding to the plurality of images respectively, for the gaze distribution information based on the visibility distribution information and the display information displayed at or in the proximity of each of the plurality of the intersecting points on the screen.

5. The non-transitory computer-readable storage medium according to claim 4, wherein the process further comprises:
    determining, for each of the plurality of the intersecting points corresponding to the plurality of images respectively, an estimated blur amount at each of the plurality of the intersecting points on the screen as viewed from the user based on the visibility distribution information; and
    determining, for each of the plurality of the intersecting points, an actual blur amount at each of the plurality of the intersecting points viewed from the user based on the display information displayed at or in the proximity of each of the plurality of the intersecting points; and wherein
    the determining the distribution width determines the distribution width based on a result of a comparison of the estimated blur amount and the actual blur amount.

6. The non-transitory computer-readable storage medium according to claim 1, wherein the process further comprises:

determining, for each of the plurality of the intersecting points corresponding to the plurality of images respectively, a weight for the gaze degree distribution at each of the plurality of the intersecting points based on the display information displayed at or in the proximity of each of the plurality of the intersecting points on the screen.

7. An information processing apparatus comprising:
a memory; and
a processor coupled to the memory and the processor configured to execute a process, the process including:
obtaining a plurality of images of eyes of a user facing a screen of a display device displaying a plurality of information;
with respect to each of the plurality of images, detecting, based on an intersecting point between a line of sight of the user and the screen of the display device, a gaze position of the user in relation to the screen of the display device;
determining a distribution width in accordance with a blur amount of information displayed on the display device at the detected gaze position for each of the plurality of images;
generating a gaze distribution information in accordance with the distribution width, the gaze distribution information indicating a degree of attention of the user with respect to the detected gaze position for each of the plurality of images; and
displaying the gaze distribution information on the screen of the display device together with the plurality of information.

8. An information processing method executed by a computer, the information processing method comprising:
obtaining a plurality of images of eyes of a user facing a screen of a display device displaying a plurality of information;
with respect to each of the plurality of images, detecting, based on an intersecting point between a line of sight of the user and the screen of the display device, a gaze position of the user in relation to the screen of the display device;
determining a distribution width in accordance with a blur amount of information displayed on the display device at the detected gaze position for each of the plurality of images;
generating a gaze distribution information in accordance with the distribution width, the gaze distribution information indicating a degree of attention of the user with respect to the detected gaze position for each of the plurality of images; and
displaying the gaze distribution information on the screen of the display device together with the plurality of information.

* * * * *